(12) United States Patent
Danner et al.

(10) Patent No.: US 7,193,625 B2
(45) Date of Patent: Mar. 20, 2007

(54) METHODS FOR DRIVING ELECTRO-OPTIC DISPLAYS, AND APPARATUS FOR USE THEREIN

(75) Inventors: Guy M. Danner, Somerville, MA (US); Karl R. Amundson, Cambridge, MA (US); Robert W. Zehner, Somerville, MA (US); Alexi C. Arango, Somerville, MA (US); Jay Britton Ewing, Somerville, MA (US)

(73) Assignee: E Ink Corporation, Cambridge, MA (US)

( * ) Notice: Subject to any disclaimer, the term of this patent is extended or adjusted under 35 U.S.C. 154(b) by 380 days.

(21) Appl. No.: 10/249,973

(22) Filed: May 23, 2003

(65) Prior Publication Data

US 2005/0270261 A1 Dec. 8, 2005

Related U.S. Application Data

(63) Continuation-in-part of application No. 10/065,795, filed on Nov. 20, 2002, now Pat. No. 7,012,600, which is a continuation-in-part of application No. 09/561,424, filed on Apr. 28, 2000, now Pat. No. 6,531,997, which is a continuation-in-part of application No. 09/520,743, filed on Mar. 8, 2000, now Pat. No. 6,504,524.

(60) Provisional application No. 60/319,007, filed on Nov. 20, 2001, provisional application No. 60/319,010, filed on Nov. 21, 2001, provisional application No. 60/319,034, filed on Dec. 18, 2001, provisional application No. 60/319,037, filed on Dec. 20, 2001, provisional application No. 60/319,040, filed on Dec. 21, 2001, provisional application No. 60/319,315, filed on Jun. 13, 2002, provisional application No. 60/319,321, filed on Jun. 18, 2002, provisional application No. 60/131,790, filed on Apr. 30, 1999.

(51) Int. Cl.
*H04N 1/46* (2006.01)

(52) U.S. Cl. .......... 345/214; 345/36; 345/48; 345/77; 345/84; 345/690; 358/455

(58) Field of Classification Search .......... 345/30, 345/84, 87, 89, 210, 214; 349/10, 24, 33, 349/34, 85, 168, 175; 359/296
See application file for complete search history.

(56) References Cited

U.S. PATENT DOCUMENTS

| | | | |
|---|---|---|---|
| 3,668,106 A | | 6/1972 | Ota |
| 3,756,693 A | | 9/1973 | Ota |
| 3,767,392 A | | 10/1973 | Ota |
| 3,792,308 A | | 2/1974 | Ota |
| 3,870,517 A | | 3/1975 | Ota et al. |
| 3,892,568 A | | 7/1975 | Ota |
| 3,972,040 A | | 7/1976 | Hilsum et al. |
| 4,041,481 A | | 8/1977 | Sato |
| 4,228,431 A | * | 10/1980 | Barclay et al. .......... 345/105 |
| 4,418,346 A | | 11/1983 | Batchelder |
| 4,430,648 A | | 2/1984 | Togashi et al. |
| 4,450,440 A | | 5/1984 | White |
| 4,529,271 A | * | 7/1985 | Berreman et al. .......... 349/34 |
| 4,636,789 A | * | 1/1987 | Yamaguchi et al. .......... 345/76 |
| 4,741,604 A | | 5/1988 | Kornfeld |
| 4,746,917 A | | 5/1988 | DiSanto et al. |
| 4,833,464 A | | 5/1989 | DiSanto et al. |
| 4,947,157 A | | 8/1990 | DiSanto et al. |
| 4,947,159 A | | 8/1990 | DiSanto et al. |
| 5,066,946 A | | 11/1991 | DiSanto et al. |
| 5,177,475 A | * | 1/1993 | Stephany et al. .......... 345/96 |
| 5,223,115 A | | 6/1993 | DiSanto et al. |
| 5,247,290 A | | 9/1993 | DiSanto et al. |
| 5,254,981 A | | 10/1993 | DiSanto et al. |
| 5,266,937 A | | 11/1993 | DiSanto et al. |
| 5,293,528 A | | 3/1994 | DiSanto et al. |
| 5,302,235 A | | 4/1994 | DiSanto et al. |
| 5,412,398 A | | 5/1995 | DiSanto et al. |
| 5,467,107 A | | 11/1995 | DiSanto et al. |
| 5,467,217 A | | 11/1995 | Check, III |
| 5,499,038 A | | 3/1996 | DiSanto et al. |
| 5,654,732 A | | 8/1997 | Katakura |
| 5,684,501 A | | 11/1997 | Knapp et al. |
| 5,689,282 A | | 11/1997 | Wolfs et al. |
| 5,699,074 A | * | 12/1997 | Sutherland et al. .......... 345/90 |

| Patent No. | Date | Inventor |
|---|---|---|
| 5,717,515 A | 2/1998 | Sheridon |
| 5,739,801 A | 4/1998 | Sheridon |
| 5,745,094 A | 4/1998 | Gordon, II et al. |
| 5,760,761 A | 6/1998 | Sheridon |
| 5,777,782 A | 7/1998 | Sheridon |
| 5,808,783 A | 9/1998 | Crowley |
| 5,831,588 A * | 11/1998 | Hotto ......................... 345/100 |
| 5,847,798 A * | 12/1998 | Yang et al. ................. 349/169 |
| 5,866,284 A | 2/1999 | Vincent |
| 5,872,552 A | 2/1999 | Gordon, II et al. |
| 5,892,504 A | 4/1999 | Knapp |
| 5,896,117 A | 4/1999 | Moon |
| 5,930,026 A * | 7/1999 | Jacobson et al. ........... 359/296 |
| 5,933,203 A * | 8/1999 | Wu et al. ..................... 349/35 |
| 5,961,804 A | 10/1999 | Jacobson et al. |
| 5,963,456 A | 10/1999 | Klein et al. |
| 5,978,052 A | 11/1999 | Ilcisin et al. |
| 5,995,173 A * | 11/1999 | Barberi et al. ................ 349/33 |
| 6,002,384 A | 12/1999 | Tamai et al. |
| 6,017,584 A | 1/2000 | Albert et al. |
| 6,034,807 A | 3/2000 | Little et al. |
| 6,054,071 A | 4/2000 | Mikkelsen, Jr. |
| 6,055,091 A | 4/2000 | Sheridon et al. |
| 6,055,180 A | 4/2000 | Gudesen et al. |
| 6,057,814 A | 5/2000 | Kalt |
| 6,061,039 A * | 5/2000 | Ryan et al. .................... 345/55 |
| 6,064,410 A | 5/2000 | Wen et al. |
| 6,067,185 A | 5/2000 | Albert et al. |
| 6,081,285 A | 6/2000 | Wen et al. |
| 6,097,531 A | 8/2000 | Sheridon |
| 6,118,426 A | 9/2000 | Albert et al. |
| 6,120,588 A | 9/2000 | Jacobson |
| 6,120,839 A | 9/2000 | Comiskey et al. |
| 6,124,851 A | 9/2000 | Jacobson |
| 6,128,124 A | 10/2000 | Silverman |
| 6,130,773 A | 10/2000 | Jacobson et al. |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,154,190 A | 11/2000 | Yang et al. |
| 6,172,798 B1 | 1/2001 | Albert et al. |
| 6,177,921 B1 | 1/2001 | Comiskey et al. |
| 6,184,856 B1 | 2/2001 | Gordon, II et al. |
| 6,211,998 B1 | 4/2001 | Sheridon |
| 6,225,971 B1 | 5/2001 | Gordon, II et al. |
| 6,232,950 B1 | 5/2001 | Albert et al. |
| 6,236,385 B1 | 5/2001 | Nomura et al. |
| 6,239,896 B1 | 5/2001 | Ikeda |
| 6,241,921 B1 | 6/2001 | Jacobson et al. |
| 6,249,271 B1 | 6/2001 | Albert et al. |
| 6,252,564 B1 | 6/2001 | Albert et al. |
| 6,262,706 B1 | 7/2001 | Albert et al. |
| 6,262,833 B1 | 7/2001 | Loxley et al. |
| 6,271,823 B1 | 8/2001 | Gordon, II et al. |
| 6,300,932 B1 | 10/2001 | Albert |
| 6,301,038 B1 | 10/2001 | Fitzmaurice et al. |
| 6,312,304 B1 | 11/2001 | Duthaler et al. |
| 6,312,971 B1 | 11/2001 | Amundson et al. |
| 6,320,565 B1 | 11/2001 | Albu et al. |
| 6,323,989 B1 | 11/2001 | Jacobson et al. |
| 6,327,072 B1 | 12/2001 | Comiskey et al. |
| 6,330,054 B1 | 12/2001 | Ikami |
| 6,348,908 B1 | 2/2002 | Richley et al. |
| 6,359,605 B1 | 3/2002 | Knapp et al. |
| 6,373,461 B1 | 4/2002 | Hasegawa et al. |
| 6,376,828 B1 | 4/2002 | Comiskey |
| 6,377,387 B1 | 4/2002 | Duthaler et al. |
| 6,392,785 B1 | 5/2002 | Albert et al. |
| 6,392,786 B1 | 5/2002 | Albert |
| 6,407,763 B1 | 6/2002 | Yamaguchi et al. |
| 6,413,790 B1 | 7/2002 | Duthaler et al. |
| 6,421,033 B1 | 7/2002 | Williams et al. |
| 6,422,687 B1 | 7/2002 | Jacobson |
| 6,445,374 B2 | 9/2002 | Albert et al. |
| 6,445,489 B1 | 9/2002 | Jacobson et al. |
| 6,459,418 B1 | 10/2002 | Comiskey et al. |
| 6,462,837 B1 | 10/2002 | Tone |
| 6,473,072 B1 | 10/2002 | Comiskey et al. |
| 6,480,182 B2 | 11/2002 | Turner et al. |
| 6,498,114 B1 | 12/2002 | Amundson et al. |
| 6,504,524 B1 | 1/2003 | Gates et al. |
| 6,506,438 B2 | 1/2003 | Duthaler et al. |
| 6,512,354 B2 | 1/2003 | Jacobson et al. |
| 6,515,649 B1 | 2/2003 | Albert et al. |
| 6,518,949 B2 | 2/2003 | Drzaic |
| 6,521,489 B2 | 2/2003 | Duthaler et al. |
| 6,531,997 B1 | 3/2003 | Gates et al. |
| 6,535,197 B1 | 3/2003 | Comiskey et al. |
| 6,538,801 B2 | 3/2003 | Jacobson et al. |
| 6,545,291 B1 | 4/2003 | Amundson et al. |
| 6,580,545 B2 | 6/2003 | Morrison et al. |
| 6,639,578 B1 | 10/2003 | Comiskey et al. |
| 6,652,075 B2 | 11/2003 | Jacobson |
| 6,657,772 B2 | 12/2003 | Loxley |
| 6,664,944 B1 | 12/2003 | Albert et al. |
| D485,294 S | 1/2004 | Albert |
| 6,672,921 B1 | 1/2004 | Liang et al. |
| 6,680,725 B1 | 1/2004 | Jacobson |
| 6,683,333 B2 | 1/2004 | Kazlas et al. |
| 6,693,620 B1 | 2/2004 | Herb et al. |
| 6,704,133 B2 | 3/2004 | Gates et al. |
| 6,710,540 B1 | 3/2004 | Albert et al. |
| 6,721,083 B2 | 4/2004 | Jacobson et al. |
| 6,724,519 B1 | 4/2004 | Comiskey et al. |
| 6,727,881 B1 | 4/2004 | Albert et al. |
| 6,738,050 B2 | 5/2004 | Comiskey et al. |
| 6,750,473 B2 | 6/2004 | Amundson et al. |
| 6,753,999 B2 | 6/2004 | Zehner et al. |
| 6,788,449 B2 | 9/2004 | Liang et al. |
| 6,816,147 B2 | 11/2004 | Albert |
| 6,819,471 B2 | 11/2004 | Amundson et al. |
| 6,822,782 B2 | 11/2004 | Honeyman et al. |
| 6,825,068 B2 | 11/2004 | Denis et al. |
| 6,825,829 B1 | 11/2004 | Albert et al. |
| 6,825,970 B2 | 11/2004 | Goenaga et al. |
| 6,831,769 B2 | 12/2004 | Holman et al. |
| 6,839,158 B2 | 1/2005 | Albert et al. |
| 6,842,167 B2 | 1/2005 | Albert et al. |
| 6,842,279 B2 | 1/2005 | Amundson |
| 6,842,657 B1 | 1/2005 | Drzaic et al. |
| 6,864,875 B2 | 3/2005 | Drzaic et al. |
| 6,865,010 B2 | 3/2005 | Duthaler et al. |
| 6,866,760 B2 | 3/2005 | Paolini Jr. et al. |
| 6,870,661 B2 | 3/2005 | Pullen et al. |
| 2001/0026260 A1 | 10/2001 | Yoneda et al. |
| 2002/0005832 A1 | 1/2002 | Katase |
| 2002/0033784 A1 | 3/2002 | Machida et al. |
| 2002/0033793 A1 | 3/2002 | Machida et al. |
| 2002/0060321 A1 | 5/2002 | Kazlas et al. |
| 2002/0063661 A1 | 5/2002 | Comiskey et al. |
| 2002/0090980 A1 | 7/2002 | Wilcox et al. |
| 2002/0113770 A1 | 8/2002 | Jacobson et al. |
| 2002/0130832 A1 | 9/2002 | Baucom et al. |
| 2002/0180687 A1 | 12/2002 | Webber |
| 2002/0196207 A1 | 12/2002 | Machida et al. |
| 2002/0196219 A1 | 12/2002 | Matsunaga et al. |
| 2003/0011560 A1 | 1/2003 | Albert et al. |
| 2003/0020844 A1 | 1/2003 | Albert et al. |
| 2003/0058223 A1 | 3/2003 | Tracy et al. |
| 2003/0063076 A1 | 4/2003 | Machida et al. |
| 2003/0102858 A1 | 6/2003 | Jacobson et al. |
| 2003/0132908 A1 | 7/2003 | Herb et al. |
| 2003/0151702 A1 | 8/2003 | Morrison et al. |
| 2003/0214695 A1 | 11/2003 | Abramson et al. |
| 2003/0222315 A1 | 12/2003 | Amundson et al. |

| | | | |
|---|---|---|---|
| 2004/0012839 | A1 | 1/2004 | Cao et al. |
| 2004/0014265 | A1 | 1/2004 | Kazlas et al. |
| 2004/0027327 | A1 | 2/2004 | LeCain et al. |
| 2004/0051934 | A1 | 3/2004 | Machida et al. |
| 2004/0105036 | A1 | 6/2004 | Danner et al. |
| 2004/0112750 | A1 | 6/2004 | Jacobson et al. |
| 2004/0119681 | A1 | 6/2004 | Albert et al. |
| 2004/0155857 | A1 | 8/2004 | Duthaler et al. |
| 2004/0180476 | A1 | 9/2004 | Kazlas et al. |
| 2004/0196215 | A1 | 10/2004 | Duthaler et al. |
| 2004/0226820 | A1 | 11/2004 | Webber et al. |
| 2005/0001810 | A1 | 1/2005 | Yakushiji et al. |
| 2005/0001812 | A1 | 1/2005 | Amundson et al. |
| 2005/0007653 | A1 | 1/2005 | Honeyman et al. |
| 2005/0035941 | A1 | 2/2005 | Albert et al. |

FOREIGN PATENT DOCUMENTS

| | | |
|---|---|---|
| DE | 25 23 763 | 12/1976 |
| EP | 1 145 072 B1 | 5/2003 |
| EP | 1 500 971 A1 | 1/2005 |
| JP | 03-91722 A | 4/1991 |
| JP | 03-096925 A | 4/1991 |
| JP | 05-173194 A | 7/1993 |
| JP | 06-233131 A | 8/1994 |
| JP | 09-016116 A | 1/1997 |
| JP | 09-185087 A | 7/1997 |
| JP | 09-230391 A | 9/1997 |
| JP | 11-113019 A | 4/1999 |
| JP | 2000-221546 | 8/2000 |
| WO | WO 99/10870 | 3/1999 |
| WO | WO 00/05704 | 2/2000 |
| WO | WO 00/36560 | 6/2000 |
| WO | WO 00/38000 | 6/2000 |
| WO | WO 00/67110 | 11/2000 |
| WO | WO 00/67327 | 11/2000 |
| WO | WO 01/07961 | 2/2001 |
| WO | WO 01/27690 | 4/2001 |

OTHER PUBLICATIONS

Amundson, K., et al., "Flexible, Active-Matrix Display Constructed Using a Microencapsulated Electrophoretic Material and an Organic-Semiconductor-Based Backplane", SID 01 Digest, 160 (Jun. 2001).

Anita, M., "Switchable Reflections Make Electronic Ink", Science, 285, 658 (1999).

Bach, U., et al., "Nanomaterials-Based Electrochromics for Paper-Quality Displays", Adv. Mater, 14(11), 845 (2002).

Chen, Y., et al., "A Conformable Electronic Ink Display using a Foil-Based a-Si TFT Array", SID 01 Digest, 157 (Jun. 2001).

Comiskey, B., et al., "An electrophoretic ink for all-printed reflective electronic displays", Nature, 394, 253 (1998).

Comiskey, B., et al., "Electrophoretic Ink: A Printable Display Material", SID 97 Digest (1997), p. 75.

Drzaic, P., et al., "A Printed and Rollable Bistable Electronic Display", SID 98 Digest (1998), p. 1131.

Duthaler, G., et al., "Active-Matrix Color Displays Using Electrophoretic Ink and Color Filters", SID 02 Digest, 1374 (2002).

Hayes, R.A., et al., "Video-Speed Electronic Paper Based on Electrowetting", Nature, vol. 425, Sep. 25, pp. 383-385 (2003).

Hunt, R.W.G., "Measuring Color", 3d. Edn, Fountain Press (ISBN 0 86343 387 1), p. 63 (1998).

Jacobson, J., et al., "The last book", IBM Systems J., 36, 457 (1997).

Jo, G-R, et al., "Toner Display Based on Particle Movements", Chem. Mater, 14, 664 (2002).

Kazlas, P., et al., "12.1" SVGA Microencapsulated Electrophoretic Active Matrix Display for Information Applicances, SID 01 Digest, 152 (Jun. 2001).

Kitamura, T., et al., "Electrical toner movement for electronic paper-like display", Asia Display/IDW '01, p. 1517, Paper HCS1-1 (2001).

Mossman, M.A., et al., "A New Reflective Color Display Technique Based on Total Internal Reflection and Substractive Color Filtering", SID 01 Digest, 1054 (2001).

O'Regan, B. et al., "A Low Cost, High-efficiency Solar Cell-Based on Dye-sensitized colloidal $TiO_2$ Films", Nature, vol. 353, Oct. 24, 1991, 773-740.

Pitt, M.G., et al., "Power Consumption of Microencapsulated Electrophoretic Displays for Smart Handheld Applications", SID 02 Digest, 1378 (2002).

Poor, A., "Feed forward makes LCDs Faster", available at "http://www.extremetech.com/article2/0,3973, 10085,00.asp".

Shiffman, R.R., et al., "An Electrophoretic Image Display with Internal NMOS Address Logic and Display Drivers," Proceedings of the SID, 1984, vol. 25, 105 (1984).

Singer, B., et al., "An X-Y Addressable Electrophoretic Display," Proceedings of the SID, 18, 255, (1977).

Webber, R., "Image Stability in Active-Matrix Microencapsulated Electrophoretic Displays", SID 02 Digest, 126 (2002).

Wood, D., "An Electrochromic Renaissance?" Information Display, 18(3), 24 (Mar. 2002).

Yamaguchi, Y., et al., "Toner display using Insulative particles charged triboelectrically", Asia Display/IDW '01, p. 1729, Paper AMD4-4 (2001).

\* cited by examiner

*Primary Examiner*—Bipin Shalwala
*Assistant Examiner*—Vincent E. Kovalick
(74) *Attorney, Agent, or Firm*—David J. Cole

(57) ABSTRACT

A method for addressing a bistable electro-optic display having at least one pixel comprises applying an addressing pulse to drive the pixel to a first optical state; leaving the pixel undriven for a period of time, thereby permitting the pixel to assume a second optical state different from the first optical state; and applying to the pixel a refresh pulse which substantially restores the pixel to the first optical state, the refresh pulse being short relative to the addressing pulse.

33 Claims, 7 Drawing Sheets

METHODS FOR DRIVING ELECTRO-OPTIC DISPLAYS, AND APPARATUS FOR USE THEREIN

CROSS REFERENCE TO RELATED APPLICATIONS

This application is a continuation-in-part of application Ser. No. 10/065,795, filed Nov. 20, 2002 (Publication No. 2003/0137521, now U.S. Pat. No. 7,012,600), which is itself is a continuation-in-part of application Ser. No. 09/561,424, filed Apr. 28, 2000 (now U.S. Pat. No. 6,531,997), which is itself a continuation-in-part of application Ser. No. 09/520,743, filed Mar. 8, 2000 (now U.S. Pat. No. 6,504,524). Application Ser. No. 10/065,795 also claims priority from the following Provisional Applications: (a) Ser. No. 60/319,007, filed Nov. 20, 2001; (b) Ser. No. 60/319,010, filed Nov. 21, 2001; (c) Ser. No. 60/319,034, filed Dec. 18, 2001; (d) Ser. No. 60/319,037, filed Dec. 20, 2001; and (e) Ser. No. 60/319,040, filed Dec. 21, 2001. This application also claims priority from application Ser. No. 60/319,315, filed Jun. 13, 2002 and application Ser. No. 60/319,321, filed Jun. 18, 2002. Application Ser. No. 09/561,424 also claims priority from application Ser. No. 60/131,790, filed Apr. 30, 1999. The entire contents of the aforementioned applications are herein incorporated by reference.

This application is also related to application Ser. No. 10/063,236, filed Apr. 2, 2002 (Publication No. 2002/0180687). The entire contents of the aforementioned applications, and of all U.S. patents and published applications mentioned below, are herein incorporated by reference.

BACKGROUND OF INVENTION

This invention relates to methods and apparatus for driving electro-optic displays, particularly bistable electro-optic displays. The methods and apparatus of the present invention are especially, though not exclusively, intended for use in driving bistable electrophoretic displays.

The term "electro-optic" as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the patents and published applications referred to below describe electrophoretic displays in which the extreme states are white and deep blue, so that an intermediate "gray state" would actually be pale blue. Indeed, as already mentioned the transition between the two extreme states may not be a color change at all.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in the aforementioned copending application Ser. No. 10/063,236 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "impulse" is used herein in its conventional meaning of the integral of voltage with respect to time. However, some bistable electro-optic media act as charge transducers, and with such media an alternative definition of impulse, namely the integral of current over time (which is equal to the total charge applied) may be used. The appropriate definition of impulse should be used, depending on whether the medium acts as a voltage-time impulse transducer or a charge impulse transducer.

Several types of bistable electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed to applying an electric field thereto, thus rotating the bodies to various positions and varying which of the sections of the bodies is seen through a viewing surface.

Another type of electro-optic medium uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. No. 6,301,038, International Application Publication No. WO 01/27690, and in application Ser. No. 10/249,128 filed Mar. 18, 2003 (Publication No. 2003/0214695, now U.S. Pat. No. 6,950,220).

Another type of electro-optic display, which has been the subject of intense research and development for a number of years, is the particle-based electrophoretic display, in which a plurality of charged particles move through a suspending fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspension medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; 6,531,997; 6,535,197; 6,538,801; and 6,545,291; and U.S. Patent Applications Publication Nos. 2002/0019081; 2002/0021270; 2002/0053900; 2002/0060321; 2002/0063661; 2002/0063677; 2002/0090980; 2002/0106847; 2002/0113770; 2002/0130832; 2002/0131147; 2002/0145792; 2002/0154382; 2002/0171910; 2002/0180687; 2002/0180688; 2002/0185378; 2003/0011560; 2003/0011867; 2003/0011868; 2003/0020844; 2003/0025855; 2003/0034949; 2003/0038755; and 2003/0053189; and International Applications Publication Nos. WO 99/67678; WO 00/05704; WO 00/20922; WO 00/26761; WO 00/38000; WO 00/38001; WO 00/36560; WO 00/67110; WO 00/67327; WO 01/07961; and WO 01/08241.

Many of the aforementioned patents and applications recognize that the walls surrounding the discrete microcapsules in an encapsulated electrophoretic medium could be replaced by a continuous phase, thus producing a so-called polymer-dispersed electrophoretic display in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned 2002/0131147. Accordingly, for purposes of the present application, such polymer-dispersed electrophoretic media are regarded as sub-species of encapsulated electrophoretic media.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; and other similar techniques.) Thus, the resulting display can be flexible. Further, because the display medium can be printed (using a variety of methods), the display itself can be made inexpensively.

A related type of electrophoretic display is a so-called "microcell electrophoretic display". In a microcell electrophoretic display, the charged particles and the suspending fluid are not encapsulated within microcapsules but instead are retained within a plurality of cavities formed within a carrier medium, typically a polymeric film. See, for example, International Application Publication No. WO 02/01281, and published U.S. application Ser. No. 2002/0075556, both assigned to Sipix Imaging, Inc.

Although electrophoretic displays are often opaque (since the particles substantially block transmission of visible light through the display) and operate in a reflective mode, electrophoretic displays can be made to operate in a so-called "shutter mode" in which the particles are arranged to move laterally within the display so that the display has one display state which is substantially opaque and one which is light-transmissive. See, for example, the aforementioned U.S. Pat. Nos. 6,130,774 and 6,172,798, and U.S. Pat. Nos. 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode.

The bistable or multi-stable behavior of particle-based electrophoretic displays, and other electro-optic displays displaying similar behavior, is in marked contrast to that of conventional liquid crystal ("LC") displays. Twisted nematic liquid crystals act are not bi- or multi-stable but act as voltage transducers, so that applying a given electric field to a pixel of such a display produces a specific gray level at the pixel, regardless of the gray level previously present at the pixel. Furthermore, LC displays are only driven in one direction (from non-transmissive or "dark" to transmissive or "light"), the reverse transition from a lighter state to a darker one being effected by reducing or eliminating the electric field. Finally, the gray level of a pixel of an LC display is not sensitive to the polarity of the electric field, only to its magnitude, and indeed for technical reasons commercial LC displays usually reverse the polarity of the driving field at frequent intervals. In contrast, bistable electro-optic displays act, to a first approximation, as impulse transducers, so that the final state of a pixel depends not only upon the electric field applied and the time for which this field is applied, but also upon the state of the pixel prior to the application of the electric field.

Although as already indicated, electrophoretic and some other electro-optic displays exhibit bistability, this bistability is not unlimited, and images on the display slowly fade with time, so that if an image is to be maintained for extended periods, the image may have to be refreshed periodically, so as to restore the image to the optical state which it has when first written.

However, such refreshing of the image may give rise to its own problems. As discussed in the aforementioned U.S. Pat. Nos. 6,531,997 and 6,504,524, problems may be encountered, and the working lifetime of a display reduced, if the method used to drive the display does not result in zero, or near zero, net time-averaged applied electric field across the electro-optic medium. A drive method which does result in zero net time-averaged applied electric field across the electro-optic medium is conveniently referred to a "direct current balanced" or "DC balanced". If an image is to be maintained for extended periods by applying refreshing pulses, these pulses need to be of the same polarity as the addressing pulse originally used to drive the relevant pixel of the display to the optical state being maintained, which results in a DC imbalanced drive scheme.

According to one aspect of the present invention, it has been found that images on displays can be refreshed, while reducing the deleterious effects associated with DC imbalanced drive schemes, if the refreshing is effected with short pulses.

A further aspect of the present invention relates to dealing with the problem that the aforementioned drive requirements of bistable electro-optic displays render conventional driving methods used for driving LCD's unsuitable for such bistable electro-optic displays. Furthermore, as discussed in the aforementioned U.S. Pat. Nos. 6,531,997 and 6,504,524, problems may be encountered, and the working lifetime of a display reduced, if the method used to drive the display does not result in zero, or near zero, net time-averaged applied electric field across the electro-optic medium. A drive method which does result in zero net time-averaged applied electric field across the electro-optic medium is conveniently referred to a "direct current balanced" or "DC balanced". Similar problems could be encountered with LCD's, but the insensitivity of such displays to the polarity of the applied electric field, and the consequent ability to reverse polarity at will, renders DC balance problems unimportant in LCD's. However, the need for DC balance is an important consideration in devising drive schemes for bistable electro-optic displays in which the electro-optic medium is sensitive to the polarity of the applied electric field.

Accordingly, a further aspect of the present invention relates to methods and apparatus for driving electro-optic displays which meet the particular requirements of bistable displays already discussed. Certain methods and apparatus of the present invention are especially intended for producing accurate gray scale rendition in bistable displays.

SUMMARY OF INVENTION

Accordingly, in one aspect, this invention provides a method for addressing a bistable electro-optic display having at least one pixel, the method comprising:

applying an addressing pulse to drive the pixel to a first optical state;

leaving the pixel undriven for a period of time, thereby permitting the pixel to assume a second optical state different from the first optical state; and applying to the pixel a refresh pulse which substantially restores the pixel to the first optical state, the refresh pulse being short relative to the addressing pulse.

This aspect of the invention may hereinafter for convenience be referred to as the "refresh pulse" method of the invention.

In this refresh pulse method, the refresh pulse will typically have an impulse not greater than about 20 percent of the impulse of the addressing pulse, desirably not greater than about 10 percent of this impulse, and preferably not greater than about 5 percent of this impulse. For reasons explained below, typically the difference between the first and second optical states does not exceed about 1 unit of L* (where L* has the usual CIE definition); desirably this difference does not exceed about 0.5 unit of L*, and preferably does not exceed about 0.2 unit of L*. A plurality of refresh pulses may be applied to the pixel at regular intervals.

In one form of the refresh pulse method, after application of the refresh pulse, there is applied to the display a second addressing pulse which drives the pixel to a third optical state different from the first and second optical states, and wherein the impulse applied by the second addressing pulse is the sum of (a) the impulse needed to drive the pixel from the first to the third optical state; and (b) an impulse equal in magnitude but opposite in polarity to the algebraic sum of the refresh pulses applied to the pixel between the first and second addressing pulses. The second addressing pulse may be of constant voltage but variable duration. In a display comprising a plurality of pixels, the second addressing pulse may be a blanking pulse which drives all the pixels of the display to one extreme optical state. In one preferred form of such a "blanking pulse/refresh pulse" process, the display comprises a plurality of pixels, the first addressing pulse is applied to each pixel so as to drive a first group of pixels white and a second group of pixels black, at least one refresh pulse is applied to each pixel, and there are thereafter applied to the display a first blanking pulse which turns all the pixels black and a second blanking pulse which drives all the pixels white, the two blanking pulses being applied in either order. The impulse applied to each of the first group of pixels during the first blanking pulse is the sum of (a) the impulse needed to drive the pixel from white to black; and (b) an impulse equal in magnitude but opposite in polarity to the algebraic sum of the refresh pulses applied to the pixel between the first addressing pulse and the first blanking pulse. Similarly, the impulse applied to each of the second group of pixels during the second blanking pulse is the sum of (c) the impulse needed to drive the pixel from black to white; and (d) an impulse equal in magnitude but opposite in polarity to the algebraic sum of the refresh pulses applied to the pixel between the first addressing pulse and the first blanking pulse.

The refresh pulse method of the invention may be used with any of the types of electro-optic medium previously described. Thus, in this method, the display may be a rotating bichromal member or electrochromic display, or an electrophoretic display, desirably an encapsulated electrophoretic display.

In another aspect, this invention provides a method for addressing a bistable electro-optic medium which comprises applying to the medium an alternating current pulse having a direct current offset.

In another aspect, this invention provides a method for addressing a bistable electro-optic medium which comprises applying to the medium an alternating current pulse, and varying at least one of the duty cycle and the frequency of the pulse to change the optical state of the electro-optic medium following the alternating current pulse.

In another aspect, this invention provides a method for addressing a bistable electro-optic display having a plurality of pixels arranged in a plurality of rows and a plurality of columns, a plurality of row electrodes each associated with one of the plurality of rows, a plurality of column electrodes each associated with one of the plurality of columns, and drive means arranged to select each of the row electrodes in turn and to apply to the column electrodes during the selection of any given row electrode voltages chosen so as to address the pixels in the row associated with the selected row electrode and write one row of a desired image on to the display. The method comprises:

writing a first image to the display;

receiving data representing a second image to be written to the display;

comparing the first and second images and dividing the rows of the display into a first set, in which at least one pixel of the row differs between the first and second images, and a second set, in which no pixel of the row differs between the first and second images; and writing the second image by sequentially selecting only the row electrodes associated with the first set of rows, and applying voltages to the column electrodes to write only the first set of rows, thereby forming the second image on the display.

In another aspect, this invention provides an electro-optic display having a plurality of pixels, at least one of the pixels comprising a plurality of sub-pixels differing from each other in area, the display comprising drive means arranged to change the optical state of the sub-pixels independently of one another. In such a display, desirably at least two of the sub-pixels differ in area by substantially a factor of two.

BRIEF DESCRIPTION OF DRAWINGS

Preferred embodiments of the present invention will now be described, though by way of illustration only, with reference to the accompanying drawings, in which.

DETAILED DESCRIPTION

Figure 1:
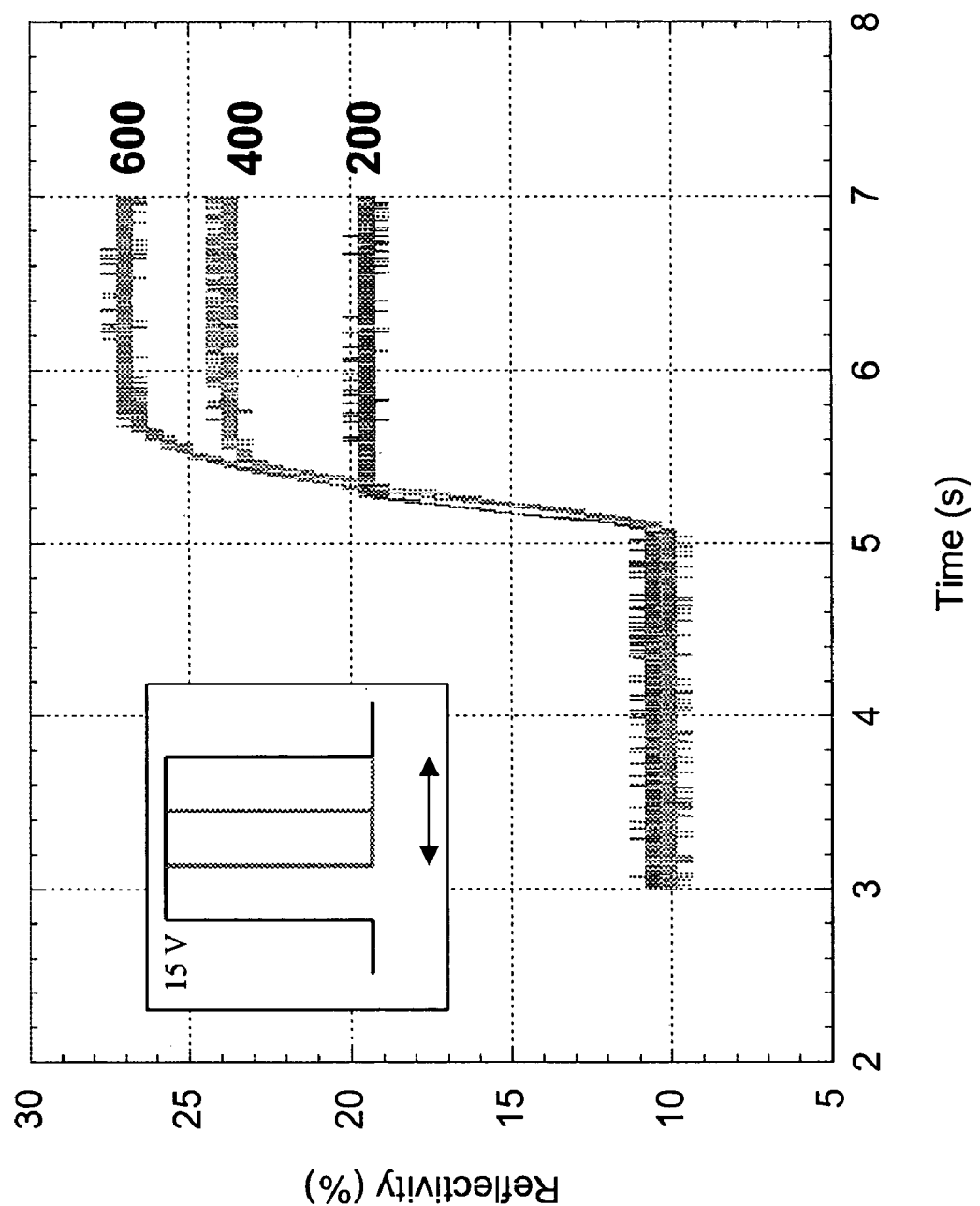
FIG. 1 is a graph showing variations of gray level with time in a display addressed using a direct current pulse with pulse length modulation.

As already indicated, the present invention provides a number of improvements in methods for addressing electro-optic media and displays, and in the construction of such displays. The various aspects of the invention will now be described sequentially, but it should be recognized that a single electro-optic medium or display may make use of more than one aspect of the invention. For example, a single electro-optic display might use AC pulse with DC offset driving and also use refresh pulses.

Refresh Pulse Method of the Invention

As already mentioned, in one aspect the present invention provides a method for refreshing the image on an electro-optic display by applying to the display a short refresh pulse. Thus, in the method of the present invention, one first applies to a pixel of a bistable display an addressing pulse which is sufficient to change the optical state of that pixel. After leaving the display undriven for an interval, one applies to the pixel a refresh pulse which is short relative to the addressing pulse. Typically, the impulse applied by the refresh pulse is not greater than about 20 (desirably not greater than 10, and preferably not greater than 5) percent of the impulse applied by the addressing pulse. For example, if a pixel requires an addressing pulse of 15 V for 500 msec, a refresh pulse could be 15 V for 10 msec, with an impulse of 2 percent of that of the addressing pulse.

The timing of the refresh pulses in this method should be adjusted to take account of the sensitivity of the human eye to abrupt small changes in optical state. The human eye is relatively tolerant of gradual fading of an image so that, for example, the bistability of an electro-optic medium of often measured as the time necessary for the lightness L* (defined by the usual CIE definition; see, for example, Hunt, R. W. G. Measuring Color, 3rd edition, Fountain Press, Kingston-upon-Thames, England (1998). (ISBN 0 86343 387 1)) to change by 2 units from the maximum for white optical states (or minimum for black states) observed after the conclusion of the addressing pulse. However, when one applies a refresh pulse to a display, an abrupt change in the lightness of the relevant pixel occurs, and abrupt changes substantially less than 1 unit in L* are readily perceived by the human eye. Depending upon the interval between refresh pulses, the changes in the image caused by these pulses may appear as a "flicker" in the image, and such flicker is highly objectionable to most observers. To avoid such flicker, or other noticeable variation in the image caused by the refresh pulses, it is desirable that the interval between the addressing pulse and the first refresh pulse, or between successive refresh pulses, be chosen so that each refresh pulse causes a minimal change in the image. Thus, the change in L* caused by a single refresh pulse should be less than about 1 unit of L*, desirably less than about 0.5 unit, and preferably less than about 0.2 unit.

Although the use of refresh pulses in the present method introduces some DC imbalance into the drive scheme during the period in which the refresh pulses are being applied, it does not preclude achieving long term DC balance in the drive scheme, and it has been found that it is the long term rather than short term DC balance which is of major importance in determining the operating life of electro-optic displays. To achieve such long term DC balance, after one or more refresh pulses have been applied, the pixel which has received the refresh pulses may be driven to its opposed optical state by a "switching" or second addressing pulse, and the impulse applied in this switching addressing pulse may be adjusted to provide DC balance (or at least minimal DC imbalance) over the whole period since the first addressing pulse, by adjusting the impulse of this second addressing pulse by an amount substantially equal in magnitude, but opposite in polarity, to the algebraic sum of the refresh pulses applied to the pixel between the two addressing pulses. For example, consider a display which can be switched between white and black optical states by applying an impulse of Â±15 V for 500 msec. Suppose a pixel of this display is first switched from black to white by applying an impulse of +15 V for 500 msec, and the white state of the pixel is subsequently maintained by applying at intervals ten refresh pulses each of +15 V for 10 msec. If after these ten refresh pulses, it is desired to return the pixel to its black optical state, this may be achieved by applying an addressing pulse of −15 V for 600 (rather than 500) msec, thereby achieving overall DC balance over the whole black-white-black transition of the pixel.

This type of adjustment of the switching addressing pulse may be effected when a new image is to be written on the display and it is thus necessary to change the optical states of certain pixels. Alternatively, the adjustment may be carried out during the application of "blanking pulses" to the display. As discussed in the aforementioned application Ser. No. 10/065,795, it is often necessary or desirable to apply at regular intervals to an electro-optic display so-called "blanking pulses"; such blanking pulses involve first driving all the pixels of the display to one extreme optical state (for example, a white state), then driving all the pixels to the opposite optical state (for example, black), and then writing the desired image. Effecting the adjustment during blanking pulses has the advantage that all of the pixels may be DC balanced at substantially the same time; the pixels which were black in the prior image (the image present immediately prior to the blanking pulse) can be DC balanced during the blanking pulse which drives all pixels white, while the pixels which were white in the prior image can be DC balanced during the blanking pulse which drives all pixels black, using the technique already described in detail above. Also, effecting the adjustment during blanking pulses can avoid the need to keep track of how many refresh pulses each individual pixel has received since its previous addressing pulse; assuming that black and white pixels are refreshed at the same intervals (as will usually be the case), and that a blanking pulse is inserted at each image transition, each pixel will need the same adjustment (except for polarity) during the blanking pulse, this adjustment being determined by the number of refresh pulses which have been applied to the display since the previous blanking pulse. Also, effecting DC balancing during blanking pulses provides a way to apply the refresh pulse method to electro-optic displays having more than two gray levels, since obviously adjusting the impulse applied during a gray-to-gray transition in such a display may lead to undesirable errors in gray levels.

The refresh pulse method of the present invention may be used as an alternative to, or in combination with, additives for increasing the bistability of an electro-optic medium. For example, the present invention may be used with the electrophoretic media described in the aforementioned 2002/0180687, which media have a suspending fluid having dissolved or dispersed therein a polymer which increases the bistability of the medium.

The following Example is now given, though by way of illustration only, to show one embodiment of the refresh pulse method of the present invention.

EXAMPLE 1

This Example uses displays containing an encapsulated dual particle opposite charge type medium comprising a polymer-coated titania white particle and a polymer-coated black particle with an uncolored suspending fluid. The displays were prepared substantially according to "Method B" described in Paragraphs [0061]–[0068] of the aforementioned 2002/0180687.

The displays prepared as described above, which contained multiple pixels, could be switched between their black and white optical states using addressing pulses of Â±15 V for 500 msec. The displays had only limited bistability, the time necessary for the white optical state to change by 2 L* units being only about 15 sec. at ambient temperature. However, it was determined empirically that the white and black optical states could be maintained indefinitely by applying short refresh pulses of Â±15 V for 4 sec/min, a duty cycle of approximately 6.7 percent. To provide a realistic test and avoid flicker in a standard image (containing both black and white areas) used in these experiments, after an initial 500 msec addressing pulse, Â±15 V refresh pulses of approximately 7 msec duration were applied to both the black and white pixels of the display at intervals of approximately 100 msec.

To determine the effects of various periods of DC imbalanced drive schemes on the displays, four different drive schemes were tested:

Scheme 480:

The display was addressed with the standard image, and this image was maintained using the aforementioned refresh pulses for 480 minutes. A series of blanking pulses were then applied, and the cycle of addressing and refresh pulses repeated. No DC balancing pulse was applied at any time. After 83 hours of operation, a series of blanking pulses were applied and then separate areas of the display, which had been white and black respectively in the standard image were tested. The area of the display which had been held white during the testing period is denoted by "480W" in the Table below, while the area which has been held black is denoted by "480D". Each tested area was driven to its white optical state by a standard 500 msec addressing pulse, and its percentage reflectance value measured; this value is denoted by "w %" in the Table. Each tested area was then allowed to stand for 15 sec without any refresh pulses being applied, and the change in L* measured after this 15 second interval; the resultant change in L*, known as the "bright holding difference", is denoted by "bhdl" in the Table. After applying further blanking pulses, each tested area was driven to its black optical state by a standard 500 msec addressing pulse, and its percentage reflectance value measured; this value is denoted by "d %" in the Table. Each tested area was then allowed to stand for 15 sec without any refresh pulses being applied, and the change in L* measured after this 15 second interval; the resultant change in L*, known as the "dark holding difference", is denoted by "dhdl" in the Table.

Scheme 60:

This scheme was identical to Scheme 480, except that the image was maintained for only 60 minutes before blanking pulses were applied. The area of the display which had been held white during the testing period is denoted by "60W" in the Table below, while the area which has been held black is denoted by "60D".

Scheme 10:

In this scheme, the image was written in the same way as in Scheme 480, and maintained for 10 minutes using the same refresh pulses as in Scheme 480. A 40 sec pulse of opposite polarity was then applied to DC balance the display, and then the image was rewritten and the cycle repeated. The area of the display which had been held white during the testing period is denoted by "10W" in the Table below, while the area which has been held black is denoted by "10D".

Scheme 1:

This scheme was identical to Scheme 10, except that the image was maintained for only 1 minute and then a 4 second DC balancing pulse was applied and the cycle repeated. The area of the display which had been held white during the testing period is denoted by "1W" in the Table below, while the area which has been held black is denoted by "1 D".

The results obtained in these experiments are shown in Table 1 below.

TABLE 1

|  | 480W | 480D | 60W | 60D |
|---|---|---|---|---|
| w % | 37.90 | 30.63 | 38.21 | 38.47 |
| d % | 2.89 | 2.69 | 3.03 | 2.45 |

TABLE 1-continued

| | | | | |
|---|---|---|---|---|
| dhdl | 2.05 | 0.64 | 4.79 | 1.05 |
| bhdl | −1.34 | −4.06 | −0.47 | −2.72 |
| | 10W | 10D | 1W | 1D |
| w % | 37.31 | 37.39 | 37.20 | 37.20 |
| d % | 2.75 | 2.75 | 3.14 | 3.13 |
| dhdl | 0.89 | 0.84 | 0.98 | 0.99 |
| bhdl | −2.24 | −2.30 | −2.02 | −1.98 |

From the data in Table 1, it will be seen that, in the highly unbalanced Scheme 480, the white state reflectance differed markedly between the areas of the display held white and black during the testing period, and the bright and dark holding differences also differed markedly. Thus, this highly unbalanced drive scheme produced substantial change in the optical states of the display, quite apart from any other effects, such as damage to the electrodes, which may occur with such unbalanced drive schemes. Also, as shown by the differences in bright and dark holding differences, the unbalanced drive scheme introduced a "bias" to the display, in the sense that areas held white for long periods tended to remain white thereafter whereas areas held black for long periods tended to remain black thereafter. The results obtained from the unbalanced Scheme 60 were similar but, as would be expected, less marked. In contrast, both the DC balanced Schemes 10 and 1 showed essentially no differences between the areas held white and black.

Thus, these experiments showed that the temporary DC imbalance produced by the use of short refresh pulses did not adversely affect the properties of the displays provided that long term DC balance was produced by spaced blanking pulses.

Electrophoretic media used in the refresh pulse method of the present invention may employ the same components and manufacturing techniques as in the aforementioned E Ink and MIT patents and applications, to which the reader is referred for further information.

Fundamental Elements of Grayscale Drive Waveforms (Including Use of AC Pulses)

Currently, as described in the aforementioned U.S. Pat. Nos. 6,531,997 and 6,504,524, many displays are switched from one extreme optical state to the other (for example, from black to white or vice versa) by applying a voltage pulse of sufficient duration to saturate the electro-optic medium; for example, in a particle-based electrophoretic medium, to move charged particles all the way to a front or back electrode. The conventional requirement that the electro-optic medium be addressed until the optical state becomes saturated does not allow for intermediate gray states. An electro-optic display that achieves grayscale offers significant advantages in graphics capability and image quality.

For convenience, a voltage waveform or drive scheme capable of achieving grayscale in a bistable electro-optic display may hereinafter be called a "grayscale waveform" or "grayscale drive scheme" respectively. There are five fundamental grayscale waveform elements which may be used in such a grayscale waveform or drive scheme; the term "grayscale waveform element" is used to mean a voltage pulse, or series of voltage pulses, that is capable of producing a change in optical state of an electro-optic display. A grayscale waveform element is itself capable of generating grayscale, and one or more grayscale waveform elements arranged in a particular sequence together form a grayscale drive waveform. A grayscale drive waveform is capable of switching a pixel of a display from one gray state to another. A sequence of one or more drive waveforms makes up a drive scheme, which is capable of displaying any series of grayscale images on a display.

Drive waveform elements fall into two basic categories, namely direct current (DC) voltage pulses and alternating current (AC) voltage pulses. In both cases, the parameters of the pulse that can be varied are the pulse height and the pulse length.

Although the generation of a grayscale optical state in an electro-optic medium is critically dependent on the manner in which voltage is applied to the medium, the ability of the medium to hold that grayscale optical state once the voltage is no longer applied is equally important in grayscale addressing schemes and this ability will depend upon the nature of the medium, as indeed will all grayscale switching properties. In this application, grayscale addressing schemes will primarily be discussed with reference to encapsulated particle-based electrophoretic media, but it is considered that the necessary modifications of such schemes to allow for the properties of other types of bistable electro-optic media will readily be apparent to those skilled in the technology of such media.

The fundamental elements of grayscale drive waveforms are as follows:

DC Pulse with Pulse Length Modulation

One of the least complex methods of realizing a desired gray state is to stop addressing the pixel in the middle of a transition from one extreme optical state to the other. In FIG. 1 of the accompanying drawings, the inset illustrates the DC pulse length modulated waveform elements used to produce the grayscale transitions in an encapsulated electrophoretic medium shown in the main part of the Figure. (The displays used in this and subsequent experiments described below were prepared substantially according to "Method B" described in Paragraphs [0061]–[0068] of the aforementioned 2002/0180687.) The three pulses used were 15 V for 200, 400 and 600 msec respectively, and the three curves produced are labelled accordingly; note that the time scale in the inset is not the same as that in the main Figure. Thus, the pulse height was fixed, while the duration of the pulse was varied for different changes in reflectivity. In FIG. 1, the reflectivity of a pixel, whose reflective state was changed from black to different levels of gray upon application of these voltage pulses, is plotted against time; it will be seen that longer pulse lengths yielded greater changes in reflectivity.

The display tested responded immediately to the end of the applied voltage pulse, and its optical state ceased to evolve. On the microscopic level, it may be presumed that the electrophoretic particles instantly stop in transit from one electrode to the other and remain suspended at an intermediate position within the capsule.

An advantage of a DC grayscale drive pulse with pulse length modulation is the speed with which the desired gray state is achieved.

DC Pulse with Pulse Height Modulation

Figure 2:
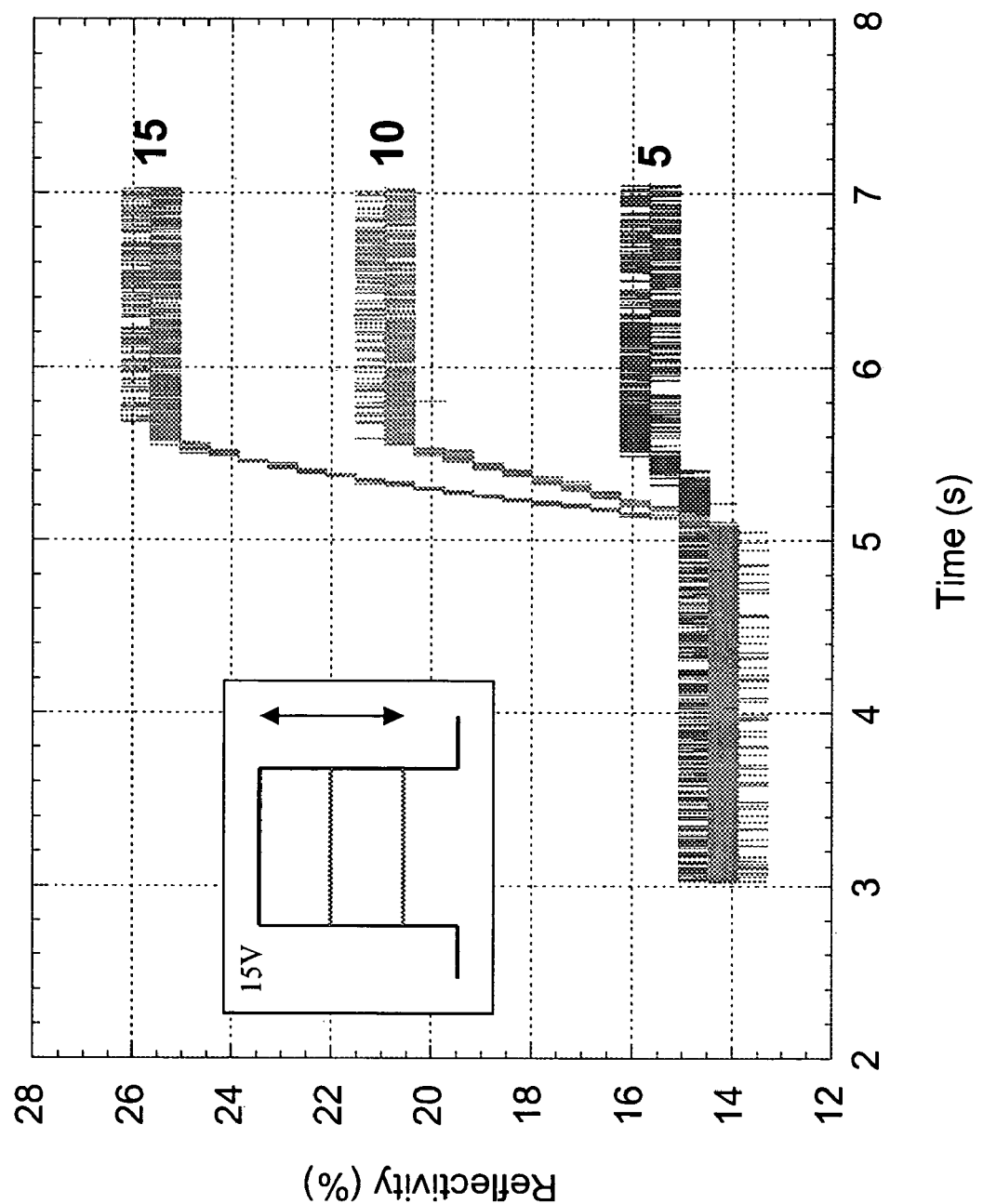
FIG. 2 is a graph similar to FIG. 1 for a display addressed using a direct current pulse with pulse height modulation.

Another approach to achieving a desired gray state is to address a pixel with a lower voltage than is required to fully switch from one extreme optical state of the pixel to the other. In FIG. 2 of the accompanying drawings, the inset illustrates the DC pulse height modulated waveform elements used to produce the grayscale transitions in an encapsulated electrophoretic medium shown in the main part of the Figure. The voltage pulse length is fixed at the length of time required to completely switch the medium at the maximum voltage level. The three pulses used were 5, 10 and 15 V for 500 msec respectively, and the three curves produced are labelled accordingly; note that the time scale in the inset is not the same as that in the main Figure. Thus, the pulse length was fixed, while the height of the pulse was varied for different changes in reflectivity. In FIG. 2, the reflectivity of a pixel, whose reflective state was changed from black to different levels of gray upon application of these voltage pulses, is plotted against time; it will be seen that greater pulse heights yielded greater changes in reflectivity.

It may be presumed that the electrophoretic particles travel through the suspending fluid at slower speeds at lower voltages and remain suspended when the driving voltage ceases to be applied.

An advantage of a DC grayscale drive pulse with pulse height modulation is accurate control of the gray state achieved.

AC Pulse with DC Offset Modulation

Figure 3:
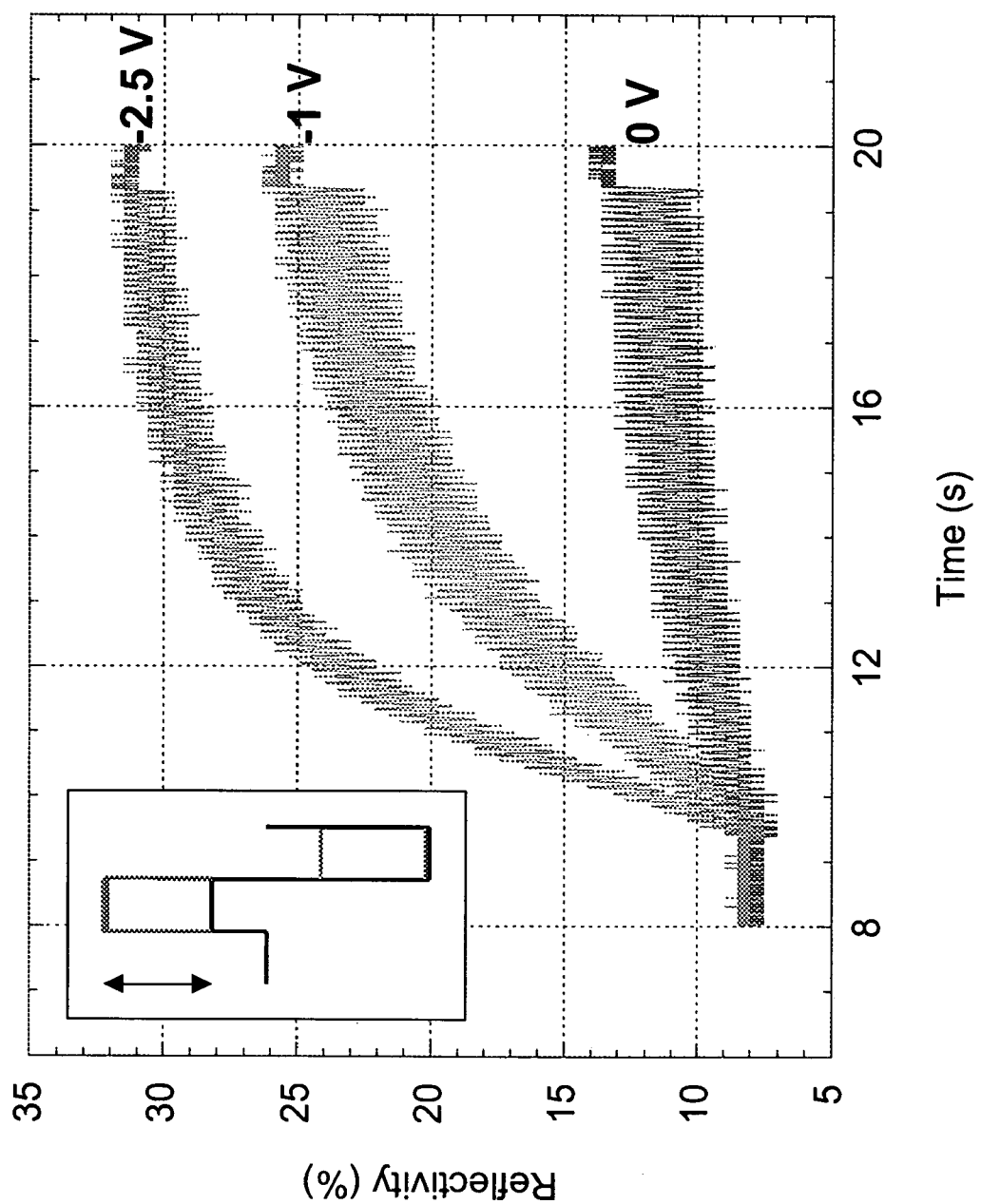
FIG. 3 is a graph similar to FIG. 1 for a display addressed using an alternating current pulse with a direct current offset in accordance with the present invention.

Grayscale driving of the aforementioned encapsulated electrophoretic medium has been effected with oscillating (AC) electric fields; the switching mechanism with such AC fields is presumed to be entirely different from that effected in the DC driving of the same medium discussed above. In FIG. 3 of the accompanying drawings, the inset illustrates the AC pulse with DC offset modulation waveform elements used to produce the grayscale transitions in an encapsulated electrophoretic medium shown in the main part of the Figure. In all cases, the frequency of the AC component (approximately 10 Hz) was set at a value that allowed the particles to respond to the oscillating field, while the magnitude and direction of the DC offset (which was 0, −1 or −2.5 V, as indicated for the three curves in FIG. 3) determined the gray state that the pixel eventually attained. As in previous Figures, the time scale used in the inset is not the same as that in the main Figure. In FIG. 3, the reflectivity of a pixel, whose reflective state was changed from black to different levels of gray upon application of these voltage pulses, is plotted against time; it will be seen that greater DC offsets yielded greater changes in reflectivity.

Upon application of an AC field, the electrophoretic particles oscillate in the suspending fluid and this oscillation is observed motion as a cyclic variation in reflectivity, superimposed upon the overall change in reflectivity, as is readily seen on the left hand side of FIG. 3. There was no net effect on reflectivity, however, until the DC offset was applied. Under the influence of a DC offset, the reflectivity approaches a constant value after the waveform has been applied for some time. It appears that there must be a restoring force that opposes the force on the particles due to the DC offset voltage, otherwise, the particles would continue to flow to the cell wall. This restoring force may be due to the motion of fluid in between the capsule wall and the particles and/or to the interaction of the particles directly with the cell wall. The stability of the optical state after the voltage is released appears consistent with that of other waveform elements.

An advantage of AC waveform elements is the ability to reach a particular reflectivity state by specifying the parameters of the waveform element, while DC waveform elements enable only a change in reflectivity. An advantage of an AC waveform element with DC offset over other AC waveform elements is that precise timing of the addressing pulse is not required.

AC Pulse with Duty Cycle Modulation

Figure 4:
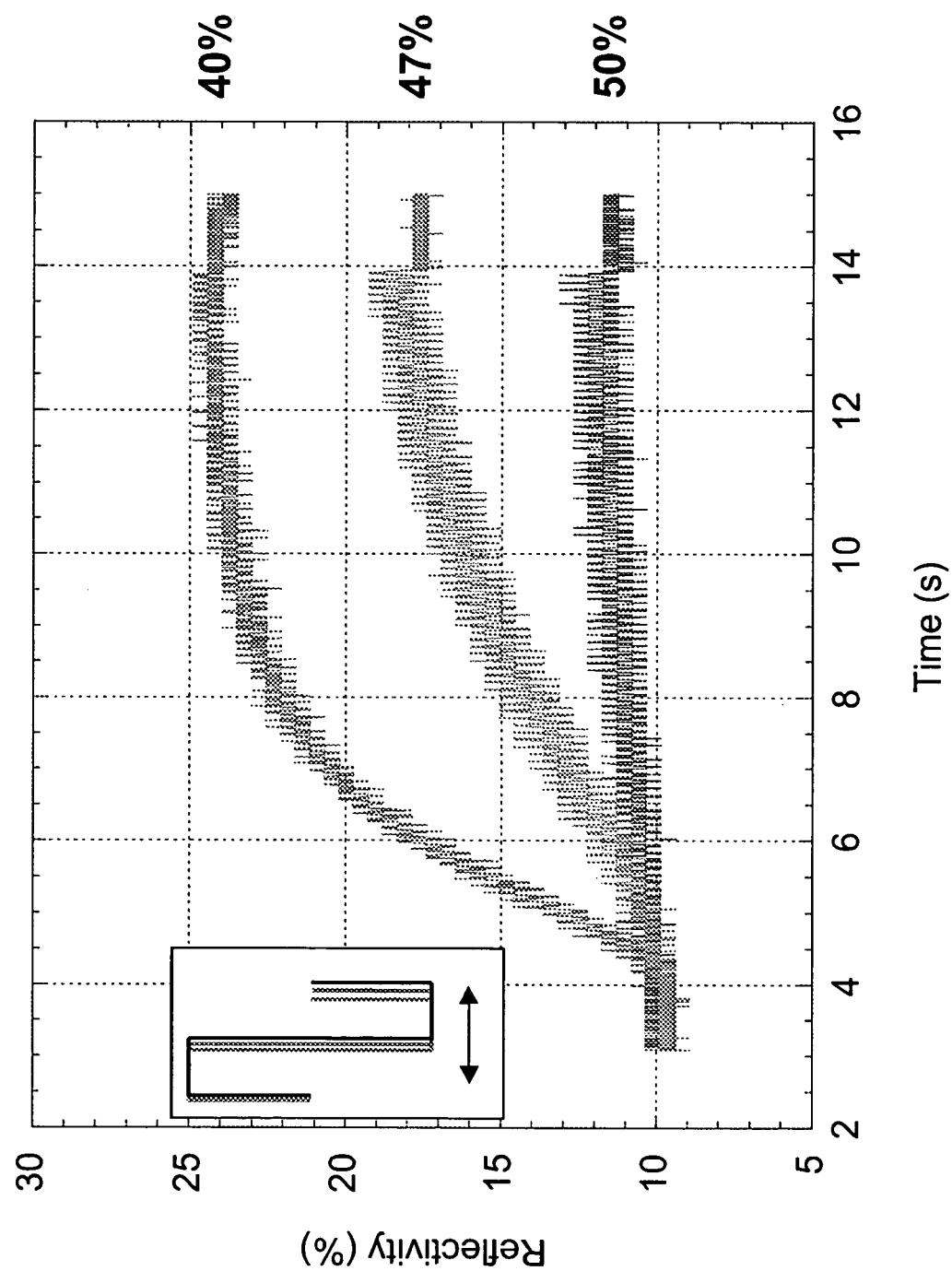
FIG. 4 is a graph similar to FIG. 1 for a display addressed using an alternating current pulse with duty cycle modulation in accordance with the present invention.

Another way to induce a DC bias with an oscillating field is to modulate the duty cycle. In FIG. 4 of the accompanying drawings, the inset illustrates the AC pulses with duty cycle modulation used to produce the grayscale transitions shown in the main part of the Figure. In each of the pulses, the voltage is set to a maximum value, and the duty cycle (the percentage of time that the voltage is in the positive or negative direction) determines the reflectivity. The three duty cycles used were 50, 47 and 40 percent, as indicated in FIG. 4. As in previous Figures, the time scale used in the inset is not the same as that in the main Figure. In this Figure, the reflectivity of a pixel, whose reflective state was changed from black to different levels of gray upon application of the voltage pulses, is plotted against time.

It will be seen from FIG. 4 that, as with the AC/DC offset pulses used to generate the curves shown in FIG. 3, the curves shown in FIG. 4 approach a constant value after the pulses have been applied for some time. Thus, as with AC/DC offset, with duty cycle modulation there appears to exist a restoring force that forces the particles away from the cell wall, maintaining a constant gray state. The physical mechanism for the restoring force appears likely the same as discussed above. Again, the gray state ceases to change immediately the pulses cease to be applied.

An advantage of an AC waveform with duty cycle modulation is that voltage modulation is not required.

AC Pulse with Frequency Modulation

Another approach to AC grayscale switching is to apply to an electro-optic medium an AC field which causes the optical state of the medium to oscillate and then to terminate the AC field in mid-cycle at the point having the desired reflectivity. The voltage may be set at a maximum value and the AC frequency varied in order to achieve a greater or lesser reflectivity range. The frequency determines the amplitude of the oscillation in reflectivity.

When such an approach is applied to an encapsulated particle-based electrophoretic medium, the electrophoretic particles respond to the AC field by oscillating around their initial positions. Since the reflectivity typically does not reach either the extreme black or white optical state, interactions with the cell wall are minimized and the response of the reflectivity is relatively linear with the applied voltage.

An advantage of AC pulses with frequency modulation is that voltage modulation is not required.

By combining the types of pulses discussed above, a multitude of waveform elements can be developed, each involving unique switching mechanisms, thus providing versatile methods for driving differing electro-optic media with differing switching characteristics.

In one specific application of the drive scheme principles discussed above, pulse width modulation and AC pulses are used to achieve an intermediate gray state in an electro-optic display which otherwise would be capable of achieving only black and white states.

For reasons already discussed, the ability to achieve gray scale is highly desirable in electro-optic displays. However, providing a large number of gray levels requires either pulse width modulation with a high frame rate driver (the high frame rate being needed to "slice" the pulse width into a large number of intervals, thereby enabling pulse width and hence gray scale to be controlled very accurately) or a driver capable of voltage modulation. Either type of driver is substantially more costly than the simple tri-level drivers, which enable individual pixels of a display to be set only to +V, −V and 0 potential (where V is an arbitrary operating potential) relative to the potential of a common front plane electrode, and which are commonly used to drive displays capable of only black and white states.

This invention provides a drive scheme which enables a tri-level driver to produce a gray level intermediate the black and white levels of a bistable electro-optic display. The drive scheme is most easily appreciated from the following Table 2, which shows the voltage applied during the successive frames of various types of transitions in such a display of the present invention:

TABLE 2

|  | 0 | 1 | 2 | 3 | 4 | 5 | 6 | ... | N − 1 | N |
|---|---|---|---|---|---|---|---|---|---|---|
| white to black | +V | +V | +V | +V | +V | +V | +V | ... | +V | +V |
| black to white | −V | −V | −V | −V | −V | −V | −V | ... | −V | −V |
| white to gray | +V | +V | +V | +V | −V | +V | −V | ... | +V | −V |
| black to gray | −V | −V | −V | −V | +V | −V | +V | ... | −V | +V |
| gray to black | +V | +V | +V | 0 | 0 | 0 | 0 | 0 | 0 | 0 |
| gray to white | −V | −V | −V | 0 | 0 | 0 | 0 | 0 | 0 | 0 |

As may be seen from Table 2 above, the transitions from black to white or vice versa are the same as in a binary (black/white only) display. The transitions to gray, on the other hand, have two parts. The first part is a square wave pulse (i.e., a plurality of frames at the same potential) of the proper polarity and length to bring the reflectivity of the electro-optic medium as close as possible to the desired middle gray lightness. The accuracy possible with this step will be limited by the frame rate of the display. The second part of the addressing pulse consists of an equal number of positive and negative voltage pulses, each one frame in width. As discussed above with reference to FIGS. 3 and 4, it has previously been demonstrated that the application of an AC square wave to an encapsulated particle-based electrophoretic medium causes the medium to "relax" to some "middle gray" state. Therefore, this second part of the pulse will bring all of the pixels to the same uniform middle gray state, regardless of previous pulse history. Addressing out from the gray state to black or white is accomplished with a short pulse of the proper polarity.

More generally, the AC portion of the pulse need not switch polarity every frame, but may switch at a lower frequency, with the voltage alternating every other frame (frequency=frame rate/4), or more generally every nth frame (frequency=frame rate/2n).

Thus, this invention provides a method to produce a single gray level in an otherwise binary electro-optic display using only a simple tri-level driver rather than with the use of a complex and costly voltage modulated driver.

In a second specific application of the drive scheme principles discussed above, this invention provides a collection of two-dimensional transition matrices, wherein each element in the matrix specifies how to get from an initial optical state (denoted "the row index" herein, although obviously the allocation of the initial optical states to rows is arbitrary) to a final optical state (denoted "the column index" herein). Each element of this matrix is constructed from a series of waveform elements (as defined above), and in general, for an n-bit grayscale display, this matrix will contain $2^{(2N)}$ elements. The matrices of the present invention take account of such considerations as the need for DC balancing of the drive scheme (as discussed above), minimizing "memory" effects in certain electro-optic media (i.e., effects whereby the result of applying a particular pulse to a pixel depends not only upon the current state of the pixel but also upon certain prior states), thereby producing uniform optical states and maximizing the switching speed of the display, while working within the constraints of an active matrix drive scheme. The present invention also provides a method for determining the optimal values of each term of the elements in such a matrix for any specific electro-optic medium. For further discussion of such matrices and their use in driving electro-optic displays, the reader is referred to the aforementioned copending application Ser. No. 10/065, 795.

The presently preferred waveforms of the invention are described below in terms of pulse width modulation (PWM) as discussed above. However, the same or similar results may be achieved using pulse height modulation, or the various hybrid types of AC modulation discussed above, and various different types of modulation may be employed within a single waveform, for example, pulse width modulation for all but the last section of the pulse, followed by voltage modulation on the last section of the pulse.

The first two waveforms of the present invention described below are "slide show" waveforms, which return from one gray state to the black state before addressing out to the next gray state. Such waveforms are most compatible with a display update scheme where the entire screen blanks at once, as in a slide projector.

Double-prepulse Slideshow Waveform

Figure 5:
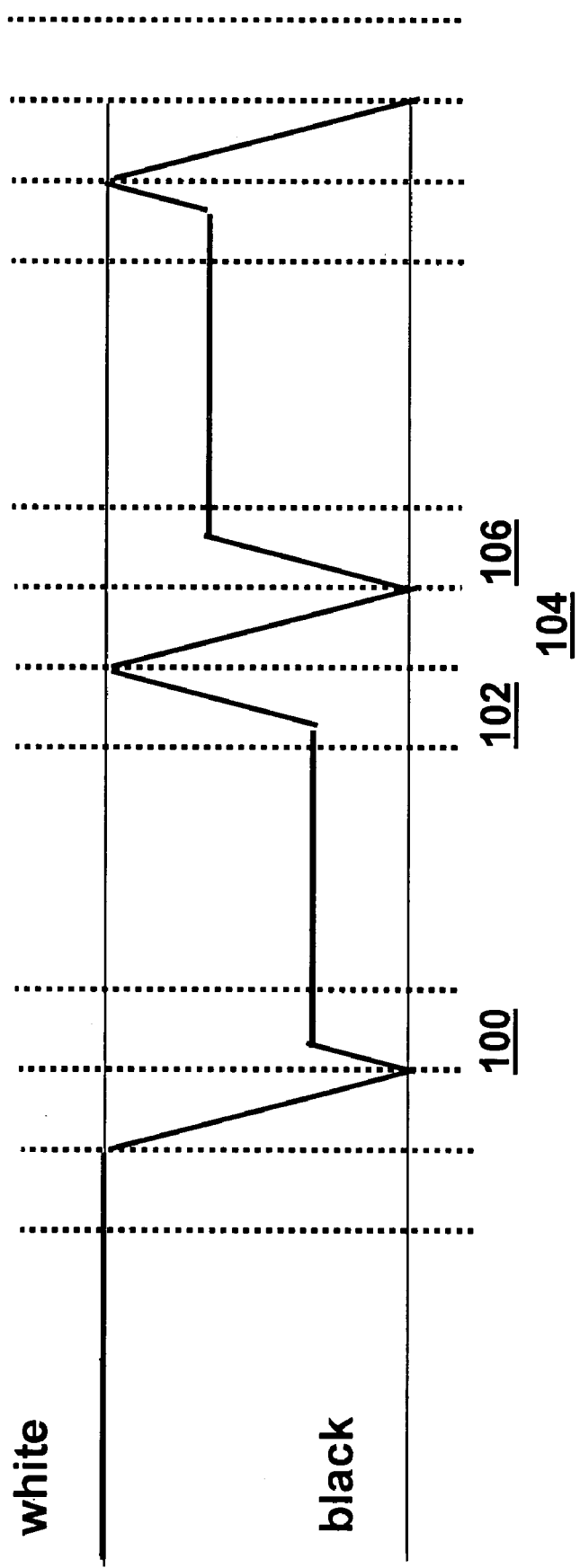
FIG. 5 is a graph showing variations of gray level with time in a display addressed using a double-prepulse slide-show waveform.

In this waveform, a preferred form of which is illustrated in FIG. 5 of the accompanying drawings, a pixel of the electro-optic medium is initially driven (as indicated at 100) from black to an initial (first) gray state using a partial pulse. To change the pixel from this initial gray state to a different desired (second) gray state, the pixel is first driven (at 102) from the first gray state to white, and then (at 104) from white to black. Finally, the proper pulse to reach the second gray state is applied at 106. To ensure that this type of waveform preserves overall DC balance, it is necessary that the sum of the lengths of the addressing pulse at 106 and the white pulse at 102 equal the length of the white-black pulse at 104. This waveform requires a maximum of three times the switching time of the medium (i.e., the time necessary for a single pixel to switch from its black optical state to its white optical state or vice versa) to effect a transition between any two arbitrary gray states, and is therefore referred to as a 3× waveform.

Single-prepulse Sideshow Waveform

Figure 6:
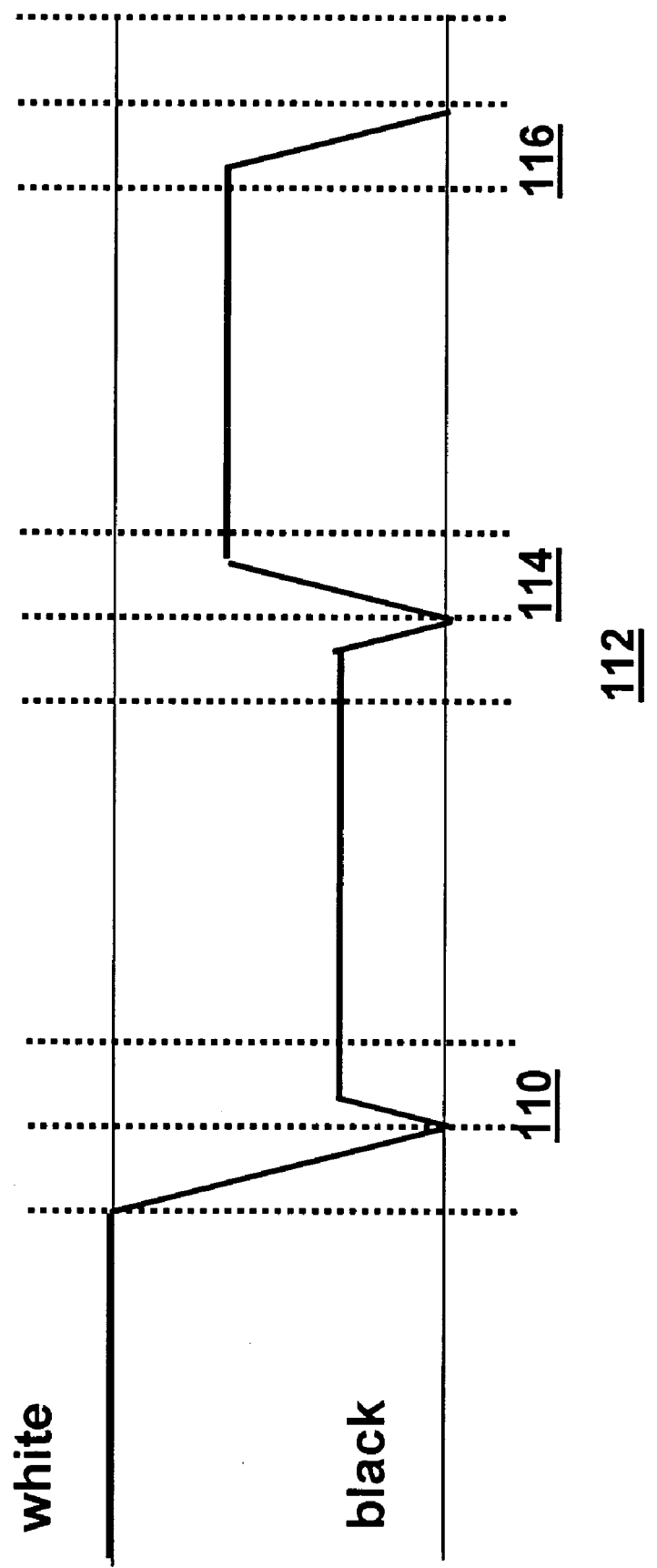
FIG. 6 is a graph showing variations of gray level with time in a display addressed using a single-prepulse slide-show waveform.

In this waveform, a preferred form of which is illustrated in FIG. 6 of the accompanying drawings, a pixel of the electro-optic medium is initially driven (as indicated at 110) from black to an initial (first) gray state using a partial pulse, in the same way as in the double-prepulse waveform discussed in Section 6 above. To change the pixel from this initial gray state to a different desired (second) gray state, the pixel is first driven (at 112) from the first gray state to black, then the proper pulse to reach the second gray state is applied at 114. Obviously, before a second transition, the pixel will again be returned to black at 116. This type of waveform preserves DC balance of the overall waveform, since the impulses applied at 112 and 116 are equal (except for polarity) to the impulses applied at 110 and 114 respectively. This waveform requires a maximum of twice the switching time of the medium to effect a transition between any two arbitrary gray states, and is therefore referred to as a 2× waveform.

Gray-to-gray Waveforms

Instead of using the slideshow waveforms described above, a display may be updated by addressing it directly from one gray state to another without passing through a black or white state. Since there are no obvious artifacts (i.e., black and/or white "flashes") associated with such a transition, it may be referred to as "gray-to-gray" addressing.

There are two main forms of gray-to-gray waveform, namely DC-balanced and DC-imbalanced.

In a DC-balanced gray-to-gray waveform, the transition between any two gray states is effected by applying a modulated pulse of the precise length necessary to shift between the two states. The electro-optic medium does not pass through any intermediate black or white states. Since the maximum pulse length is equal to the addressing time of the ink, such a waveform may be referred to as a 1× waveform. To maintain DC balance, for a display with n gray states, there are n–1 free parameters available in the optimization of the transition matrix associated with any specific waveform. This results in a highly over-constrained system. For example, all transitions are required to be equal and opposite in impulse to the reverse transition (i.e. 2–3 must be the same as 3-2, except for polarity).

A DC-imbalanced gray-to-gray waveform is fundamentally the same as a DC-balanced one, except that the pulse lengths are no longer constrained by the restriction of DC balancing. Thus, each of the $2^{(2N)}$ entries in the transition matrix can vary independently of all the others.

The various waveforms discussed above enable grayscale addressing in active matrix displays, which is crucial for the use of electro-optic media in personal digital assistant (PDA) and electronic book applications. These waveforms minimize the effects of memory in the electro-optic medium, and such memory can lead to image ghosting. By choosing optimal pulse lengths and sequences, desired gray optical states can be achieved in a minimum number of pulses.

Selective Row Driving

Another aspect of the present invention relates to improving the performance of an active matrix bistable electro-optic display by selective driving of the rows of the display.

As already mentioned, and as discussed in more detail in some of the aforementioned patents and applications, to maintain a desired image on a conventional LCD, the whole image area must be continuously refreshed, since typically liquid crystals are not bistable and an image on an LCD will fade within a very short time unless refreshed. As is well known to those skilled in the art of active matrix LCD's, in such displays the continuous refreshment is effected by using a row driver to turn on the gates of the transistors associated with one row of pixels of the display, placing on column drivers (connected to the source electrodes of the transistors in each column of the display) the potentials needed to write to the pixels in the selected row the relevant portion of the desired image on the display, and thus writing the selected row of the display. The row driver then selects the next row of the display and the process is repeated, with the rows thus being refreshed cyclically. (The assignment of the row drivers to gate electrodes and the column drivers to source electrodes is conventional but essentially arbitrary, and could of course be reversed if desired.)

Because an LCD requires continuous refreshing of an image, a change of only part of a displayed image is handled as part of the overall refreshing procedure. In a continuously-refreshed display there need be no provision for updating part of an image; since in effect a new image is being written to the display several times per second (in the case of an LCD), any change of part of an image fed to the display automatically appears on the display within a short interval. Consequently, the conventional circuitry developed for use with LCD's makes no provision for updating of only part of an image.

In contrast, bistable electro-optic displays do not need continuous refreshing, and indeed such continuous refreshing is undesirable, since it unnecessarily increases the energy consumption of the display. Furthermore, during such refreshing, the gate (row) lines may deliver capacitative voltage spikes to pixel electrodes, and any driver voltage errors or uncompensated gate feedthrough bias errors can accumulate; all these factors can result in undesirable shifts in the optical states of the pixels of the display. Accordingly, in bistable electro-optic displays it is desirable to provide some means for updating a portion of an image without the need to rewrite the whole image on the display, and one aspect of this invention relates to a bistable electro-optic display provided with such "partial updating" means. According to the present invention, this is done by comparing successive images to be written to the display, identifying the rows which differ in the two images, and addressing only the rows thus identified.

In the present method, to effect a partial update of a display only the rows of the display containing pixels which are to change optical state are identified. In a preferred form of this method, for every line of the display, a display controller (cf. the aforementioned copending application Ser. No. 10/065,795) examines all of the desired pixel electrode output voltages. If all of the output voltages for that line are equal to the potential $V_{com}$ of the common front electrode of the display (i.e., if no pixel in that row needs to be rewritten), then the controller outputs a synchronizing ($V_{sync}$) pulse without loading data values into the column drivers, and without issuing a corresponding output enable (OE) command. The net effect of this is that the token bit for the row drivers is passed to the next row of the display without activating the current row. Data is only loaded into the column drivers, and output enable is only asserted, for rows where at least one pixel needs to be rewritten.

This invention gives two distinct types of advantages. Firstly, many sources of spurious voltage are eliminated for pixels that are not rewritten. There is no capacitative gate spike for these pixels, and errors in the column driver voltage will not be passed on to a pixel in frames where it is not addressed. Because of the relatively lower resistivity of many electro-optic media, especially electrophoretic media, as compared with liquid crystals, the pixel electrode will tend to relax to the actual front plane voltage, thus maintaining the hold state of the electro-optic medium. Secondly, power consumption of the display is minimized. For every row that is not rewritten, the corresponding gate line does not have to be charged. In addition, when data is not loaded into the column drivers of the display, the additional power consumption of moving that data across the display interface is also eliminated.

Spatial Area Dithering

The aspects of the present invention previously discussed relate to the waveforms used to drive electro-optic displays. However, the behavior of such displays can also be changed by varying the structure of the backplane, and this aspect of the invention relates to dividing one or more pixels, and preferably each pixel, of a display into a plurality of sub-pixels having differing areas.

As already noted, it is highly desirable to provide gray-scale in an electro-optic display. This gray scale may be achieved either by driving a pixel of the display to a gray state intermediate its two extreme states. However, if the medium is not capable of achieving the desired number of intermediate states, or if the display is being driven by drivers which are not capable of providing the desired number of intermediate states, other methods must be used to achieve the desired number of states, and this aspect of the invention relates to the use of spatial dithering for this purpose.

A display may be divided into a plurality of "logical" pixels, each of which is capable of displaying the desired number of gray or other optical states. However, obviously more than one physically separate area can be present at each logical pixel, and indeed it is common in color displays to make use of "full color" logical pixels each of which comprises three sub-pixels of primary colors, for example red, green and blue; see, for example, the aforementioned 2002/0180688. Similarly, one could achieve gray scale by using as a logical pixel an assembly of sub-pixels, each of which was capable of only binary switching. For example, a logical pixel comprising four independently controllable sub-pixels of equal area could be used to provide two-bit gray scale. However, for anything more than one- or two-bit gray scale, the number of sub-pixels becomes inconveniently great, since the required number of sub-pixels doubles for each one-bit increase in gray scale.

The present invention provides an electro-optic display having at least one pixel which comprises a plurality of sub-pixels, these sub-pixels being of differing areas. In a preferred embodiment of this invention, at least two sub-pixels differ in area by substantially a factor of two. Thus, for example, a logical pixel might have sub-pixels with areas of 1×, 2× and 4×, where X is an arbitrary area. A logical pixel of this type is illustrated schematically in FIG. 7A of the accompanying drawings. This logical pixel achieves three-bit grayscale using only three electrodes, whereas achieving the same three-bit grayscale with sub-pixels of equal area would require eight sub-pixels.

When driven, each sub-pixel reflects or transmits a portion of the incoming light, and the fractional amount is dictated by the area of the sub-pixel. If the reflectance/transmission is averaged over the area of the logical pixel, then a binary weighting of driven area is achieved, and hence spatially dithered grayscale.

Figure 7A:
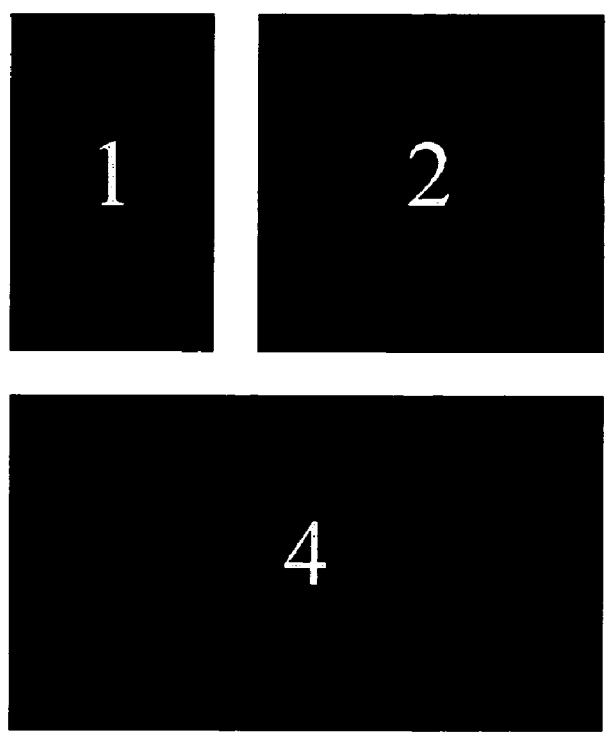
FIGS. 7A and 7B show possible arrangements of sub-pixels within a single pixel of a display of the present invention.

The areas of the sub-pixels are arbitrary. The ones shown in FIG. 7A are weighed by reflectance. If one were to use a non-linear weighting (as would be appropriate for equal steps in L* or a gamma corrected grayscale spacing), the areas would be changed accordingly.

Careful consideration should be given to the shape of the sub-pixels, in addition to consideration of their relative areas. Simple large blocks, as in FIG. 7A, allow simple patterning of the sub-pixel array, but under certain conditions the sub-pixels may be resolved by a viewer. Also, if a large area (covering many logical pixels) is displayed with a mid-level gray (so that (say) only the area 4 in FIG. 7A is driven in each logical pixel), a viewer still see a line or grating pattern arising from the pattern of sub-pixels.

Increasing the resolution of the logical pixels reduces these problems, but requires a large number of additional pixels, however, as the number of pixels increases as the square of the resolution. Instead, the problems of sub-pixel visibility and/or visible patterning can be reduced by interdigitating the sub-pixels as shown, for example, in FIG. 7B; note that this Figure is only intended to illustrate interdigitation, and not to accurately represent the relative areas of the sub-pixels. Many interdigitated patterns similar to that of FIG. 7B can be used to improve image quality.

Another approach to dealing with the problems of sub-pixel visibility and/or visible patterning is to randomly orient the sub-pixels. For example, in an array of pixels each of which has the sub-pixel arrangement shown in FIG. 7A, individual pixels could have, at random, each of the four possible orientations of the arrangement shown in FIG. 7A. Such "randomization" of the sub-pixels helps to break up patterns and render them less noticeable to an observer.

Figure 7B:
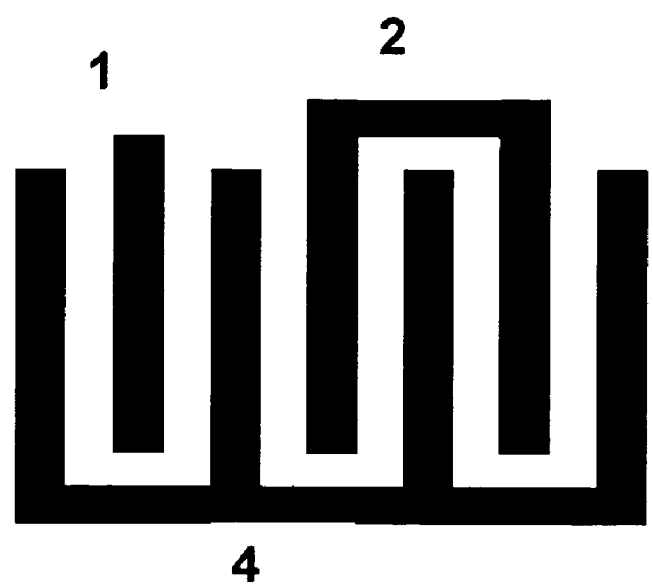

Although the embodiments of the present invention shown in FIGS. 7A and 7B produce three-bit grayscale, it will be appreciated that the present invention can produce any number of bits of gray scale simply by adding additional sub-pixels.

This aspect of the present invention has the advantages that:

(a) The electro-optic medium itself does not need to be capable of gray scale; essentially the display can be a black/white display, and sub-pixels turned on and off to produce gray scale. In a scanned array, the necessary control of the sub-pixels can be achieved by providing additional column drivers for the same number of rows, as in color sub-pixel arrays. This reduces demands upon the electro-optic medium used; for example, one does not need to worry about possible drift of gray levels of the medium over its operating lifetime.

(b) There is no need for complicated column drivers; the present invention is compatible with simple use binary level drivers used in many conventional displays thus facilitating the use of a variety of electro-optic media with readily available, inexpensive "off-the-shelf" components. Some methods of generating grayscale require voltage modulated drivers for the column electrodes, and such drivers are not widely available and are more expensive/harder to build than binary level drivers.

(c) The thin film transistor (TFT) design for an active matrix array using the present invention need be no harder than that required for full color, where there are three sub-pixels (for example, RGB) per pixel, and the amount of data which needs to be supplied to the various components is no greater. Thus no new technology development is required in an active matrix backplane to implement the present invention.

Miscellaneous Techniques

In most conventional active matrix drive schemes for electro-optic displays, the voltages of the pixel electrodes on the display backplane are varied in order to impose desired voltages across pixels. The top plane is typically held at a particular voltage deemed advantageous for addressing the pixels. For example, if the data line voltage supplied to the pixel electrodes varies between zero volts and a voltage $V_0$, the top plane may be held at $V_0/2$ in order to permit voltage drops across the pixel to be as large as $V_0/2$ in both directions.

According to one aspect of this invention, the voltage of the top plane may be varied to enhance the addressing of the electro-optic medium. For example, the top plane voltage could be held at zero volts in order to permit the total pixel voltage drop (top plane minus pixel voltage) to be as low at $-V_0$. Raising the top plane up to $V_0$ permits a pixel voltage drop as large as $V_0$. These larger voltage drops permit faster addressing of the electro-optic medium.

More generally, it may be advantageous to be able to set the top plane voltage not only at voltages zero and $V_0$, but to other voltages as well. For example, it may be advantageous to apply a global time-varying voltage across the electro-optic medium in concert with pixel-to-pixel voltages imposed by the backplane.

It is known to provide an electro-optic display with a capacitor formed between a pixel electrode and an electrode formed by an extension of a select line so as to charged with the same voltage as the select line; as described in the aforementioned WO 01/07961, the provision of such a capacitor reduces the rate of decay of the electric field across the relevant pixel after the driving voltage is removed. In another aspect, this invention provides an electro-optic display having a storage capacitor formed between a pixel electrode and a (second) electrode that has a voltage that can be varied independently from the select lines of the display. In a preferred embodiment, the second electrode follows the top plane voltage, that is, its voltage differs from the top plane only by a time-independent constant. The provision of this type of capacitor greatly reduces the capacitative voltage spikes experienced by the pixel, as compared with a storage capacitor is created by an overlap between a pixel electrode and a select line that controls the adjacent (previous) row of the display.

Another aspect of the present invention relates to reducing or eliminating unwanted switching of the electro-optic medium by select and data lines.

As discussed above, select and data lines are essential elements of an active matrix panel in that they provide the voltages required for charging pixel electrodes to desired values. However, the select and data lines can have the unwanted effect of switching the electro-optic medium adjacent the data lines. The undesirable optical artifacts caused by such switching can be eliminated by using a black mask to hide the regions switched by the data and/or select lines from a viewer. However, providing such a black mask requires registration of the front plane of the display with its back plane and a reduction in the fraction of the electro-optic medium that is exposed to the viewer. The result is a display darker and lower in contrast than one could achieve without the black mask.

In another aspect of the present invention, the need for a black mask is avoided by making the data lines to have a small lateral extent in one direction so that they do not appreciably address the adjacent electro-optic medium during normal display operation. This obviates the need for a black mask.

A related aspect of the present invention relates to the use of passivated electrodes and modification of the drive scheme used to drive the electro-optic medium. An impulse-driven electro-optic medium can be electronically addressed when it is in a thin film form between two electrodes. Generally, the electrodes make contact with the electro-optic medium. However, it is also possible to address the medium even when a dielectric material with a long electronic relaxation time exists between one or both electrodes and the medium. Passivation of one or both electrodes may be desirable to avoid adverse chemical or electrochemical interactions at the backplane or front plane of a display device; see the aforementioned WO 00/38001. Although the ability to sustain a voltage across the electro-optic medium is greatly reduced by the presence of a dielectric layer, a voltage impulse can still be applied to the medium and the medium can be addressed through these voltage impulses if the dielectric layer is properly engineered.

The optical state of an electro-optic medium is of course achieved by changing the voltage on a pixel electrode. This voltage change results in a voltage across the electro-optic medium that decays as charge leaks through the medium. If an external dielectric layer (i.e., a dielectric layer between the medium and one electrode) is sufficiently thin and the electro-optic medium is sufficiently resistive, the voltage impulse across the medium will be sufficient to cause a desirable shift in the optical state of the medium. Electronic addressing of an electro-optic medium through a dielectric layer is therefore possible. The addressing scheme is different, however, from addressing an electro-optic medium with electrodes in direct contact with the medium since, in the latter case, the medium is addressed by applying voltages across the pixel, whereas, in the former case, addressing is achieved by causing a change in the pixel voltage. At every change, a voltage impulse is experienced by the electro-optic medium.

Finally, this invention provides drive schemes for reducing cross-talk in active matrix electro-optic displays.

Inter-pixel cross-talk, where addressing one pixel affects the optical state of other pixels, is undesirable but has many causes. One cause is the finite current flow through transistors in the off state. Bringing a data line to a voltage intended for charging one pixel can charge up transistors in unselected rows because of off state current leakage. A solution is to use transistors with a low off-state current.

Another source of cross talk is current leakage between neighboring pixels. Current can leak through elements of the backplane or through the electro-optic medium in contact with the backplane. A solution to such cross talk is to design the backplane with a large insulating gap between the pixel electrodes. A larger gap will result in smaller leakage currents.

As already indicated, a preferred type of electro-optic medium for use in the present invention is an encapsulated particle-based electrophoretic medium. Such electrophoretic media used in the methods and apparatus of the present invention may employ the same components and manufacturing techniques as in the aforementioned E Ink and MIT patents and applications, to which the reader is referred for further information.

Numerous changes and modifications can be made in the preferred embodiments of the present invention already described without departing from the spirit of the invention. Accordingly, the foregoing description is to be construed in an illustrative and not in a limitative sense.

The invention claimed is:

1. A method for addressing a bistable electro-optic display having at least one pixel, the method comprising:
    applying an addressing pulse to drive the pixel to a first optical state;
    leaving the pixel undriven for a period of time, thereby permitting the pixel to assume a second optical state different from the first optical state; and
    applying to the pixel a refresh pulse which substantially restores the pixel to the first optical state, the refresh pulse being short relative to the addressing pulse.

2. A method according to claim 1 wherein the refresh pulse has an impulse not greater than about 20 per cent of the impulse of the addressing pulse.

3. A method according to claim 2 wherein the refresh pulse has an impulse not greater than about 10 per cent of the impulse of the addressing pulse.

4. A method according to claim 3 wherein the refresh pulse has an impulse not greater than about 5 per cent of the impulse of the addressing pulse.

5. A method according to claim 1 wherein the difference between the first and second optical states does not exceed about 1 unit of L*.

6. A method according to claim 5 wherein the difference between the first and second optical states does not exceed about 0.5 unit of L*.

7. A method according to claim 6 wherein the difference between the first and second optical states does not exceed about 0.2 unit of L*.

8. A method according to claim 1 wherein a plurality of refresh pulses are applied to the pixel at regular intervals.

9. A method according to claim 1 in which the display is a rotating bichromal member or electrochromic display.

10. A method according to claim 1 in which the display is an electrophoretic display.

11. A method according to claim 10 in which the display is an encapsulated electrophoretic display.

12. A method according to claim 10 in which the display is a polymer-dispersed electrophoretic display comprising a plurality of discrete droplets of an electrophoretic fluid within a continuous phase of a polymeric material.

13. A method according to claim 10 in which the display is a microcell electrophoretic display comprising charged particles and a fluid retained within a plurality of cavities formed in a carrier medium.

14. A method for addressing a bistable electro-optic display having at least one pixel, the method comprising:
applying an addressing pulse to drive the pixel to a first optical state;
leaving the pixel undriven for a period of time, thereby permitting the pixel to assume a second optical state different from the first optical state;
applying to the pixel a refresh pulse which substantially restores the pixel to the first optical state, the refresh pulse being short relative to the addressing pulse, and
after application of the refresh pulse, applying to the display a second addressing pulse which drives the pixel to a third optical state different from the first and second optical states, the impulse applied by the second addressing pulse being the sum of (a) the impulse needed to drive the pixel from the first to the third optical state; and (b) an impulse equal in magnitude but opposite in polarity to the algebraic sum of the refresh pulses applied to the pixel between the first and second addressing pulses.

15. A method according to claim 14 wherein the second addressing pulse is of constant voltage but variable duration.

16. A method according to claim 14 wherein the display comprises a plurality of pixels and the second addressing pulse comprises a blanking pulse which drives all the pixels of the display to one extreme optical state.

17. A method according to claim 14 in which the display is a rotating bichromal member or electrochromic display.

18. A method according to claim 14 in which the display is an electrophoretic display.

19. A method according to claim 18 in which the display is an encapsulated electrophoretic display.

20. A method according to claim 18 in which the display is a polymer-dispersed electrophoretic display comprising a plurality of discrete droplets of an electrophoretic fluid within a continuous phase of a polymeric material.

21. A method according to claim 18 in which the display is a microcell electrophoretic display comprising charged particles and a fluid retained within a plurality of cavities formed in a carrier medium.

22. A method for addressing a bistable electro-optic display comprising a plurality of pixels, the method comprising:
applying an addressing pulse to each pixel so as to drive a first group of pixels white and a second group of pixels black;
leaving the first and second groups of pixels undriven for a period of time, thereby permitting the first and second groups of pixels to assume optical states different from their white and black optical states;
applying at least one refresh pulse to each pixel, thereby substantially restoring the first and second groups of pixels to their white and black optical states respectively; and
thereafter applying to the display a first blanking pulse which turns all the pixels black and a second blanking pulse which drives all the pixels white, the two blanking pulses being applied in either order, the impulse applied to each of the first group of pixels during the first blanking pulse being the sum of (a) the impulse needed to drive the pixel from white to black; and (b) an impulse equal in magnitude but opposite in polarity to the algebraic sum of the refresh pulses applied to the pixel between the addressing pulse and the first blanking pulse, and the impulse applied to each of the second group of pixels during the second blanking pulse being the sum of (c) the impulse needed to drive the pixel from black to white; and (d) an impulse equal in magnitude but opposite in polarity to the algebraic sum of the refresh pulses applied to the pixel between the addressing pulse and the first blanking pulse.

23. A method according to claim 22 in which the display is a rotating bichromal member or electrochromic display.

24. A method according to claim 22 in which the display is an electrophoretic display.

25. A method according to claim 24 in which the display is an encapsulated electrophoretic display.

26. A method according to claim 24 in which the display is a polymer-dispersed electrophoretic display comprising a plurality of discrete droplets of an electrophoretic fluid within a continuous phase of a polymeric material.

27. A method according to claim 24 in which the display is a microcell electrophoretic display comprising charged particles and a fluid retained within a plurality of cavities formed in a carrier medium.

28. A method for addressing a bistable electro-optic display comprising a plurality of pixels, the method comprising:
applying an addressing pulse to each pixel so as to drive a first group of pixels white and a second group of pixels black;
leaving the first and second groups of pixels undriven for a period of time, thereby permitting the first and second groups of pixels to assume optical states different from their white and black optical states;
applying a first refresh pulse having one polarity to the first group of pixels thereby substantially restoring the first group of pixels to the white optical state, the first refresh pulse being short relative to the addressing pulse; and
applying a second refresh pulse having a polarity opposed to said one polarity to the second group of pixels thereby substantially restoring the second group of pixels to the black optical state, the second refresh pulse being short relative to the addressing pulse.

29. A method according to claim 28 in which the display is a rotating bichromal member or electrochromic display.

30. A method according to claim 28 in which the display is an electrophoretic display.

31. A method according to claim 30 in which the display is an encapsulated electrophoretic display.

32. A method according to claim 30 in which the display is a polymer-dispersed electrophoretic display comprising a plurality of discrete droplets of an electrophoretic fluid within a continuous phase of a polymeric material.

33. A method according to claim 30 in which the display is a microcell electrophoretic display comprising charged particles and a fluid retained within a plurality of cavities formed in a carrier medium.

* * * * *